US011974042B2

(12) United States Patent
Arai et al.

(10) Patent No.: US 11,974,042 B2
(45) Date of Patent: Apr. 30, 2024

(54) SIGNAL PROCESSING DEVICE AND SIGNAL PROCESSING METHOD

(71) Applicant: Sony Semiconductor Solutions Corporation, Kanagawa (JP)

(72) Inventors: Hiroshi Arai, Kanagawa (JP); Yuriko Ohtsuka, Kanagawa (JP); Kenichiro Nishi, Kanagawa (JP); Takeshi Masuura, Kanagawa (JP); Norimitsu Okiyama, Kanagawa (JP); Yuji Matsui, Kanagawa (JP); Satoshi Takashima, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 18/000,512

(22) PCT Filed: Apr. 20, 2021

(86) PCT No.: PCT/JP2021/016039
§ 371 (c)(1),
(2) Date: Dec. 2, 2022

(87) PCT Pub. No.: WO2021/251005
PCT Pub. Date: Dec. 16, 2021

(65) Prior Publication Data
US 2023/0308759 A1 Sep. 28, 2023

(30) Foreign Application Priority Data
Jun. 9, 2020 (JP) .................................. 2020-099937

(51) Int. Cl.
H04N 23/68 (2023.01)

(52) U.S. Cl.
CPC ....... *H04N 23/6842* (2023.01); *H04N 23/683* (2023.01)

(58) Field of Classification Search
None
See application file for complete search history.

(56) References Cited

U.S. PATENT DOCUMENTS

| 2017/0310897 A1* | 10/2017 | Koishi | H04N 23/687 |
| 2018/0276542 A1* | 9/2018 | Cheng | G06F 16/9535 |
| 2022/0101974 A1* | 3/2022 | Li | G06N 3/045 |

FOREIGN PATENT DOCUMENTS

| CN | 111026058 A * | 4/2020 | ....... G05B 19/41875 |
| JP | 2005-092465 A | 4/2005 | |

(Continued)

OTHER PUBLICATIONS

English translation of CN-111026058-A, Ge, Apr. 2020 (Year: 2020).*

(Continued)

*Primary Examiner* — James M Hannett
(74) *Attorney, Agent, or Firm* — XSENSUS LLP

(57) ABSTRACT

A signal processing device includes an approximate curved surface conversion unit that includes a first stacked autoencoder pretrained on the basis of learning input data constituted by coordinate data acquired for each of multiple elements of an object, and that obtains approximate curved surface data indicating an approximate curved surface of the object in an intermediate layer of the first stacked autoencoder, on the basis of input data constituted by the coordinate data acquired for each of the elements, and a geometric modulation processing unit that includes a second stacked autoencoder having learned by machine learning on the basis of learning input data constituted by the approximate curved surface data and on the basis of training data constituted by a result obtained by coordinate conversion for (Continued)

each of the elements in a geometric modulation process performed for the object, and performs the geometric modulation process.

7 Claims, 20 Drawing Sheets

(56) References Cited

FOREIGN PATENT DOCUMENTS

| | | | |
|---|---|---|---|
| JP | 2014-066995 A | | 4/2014 |
| JP | 2018-136430 A | | 8/2018 |
| JP | 2020-009203 A | | 1/2020 |
| TW | 201102676 A | * | 1/2011 ............. G02B 13/16 |
| WO | 2019/092900 A1 | | 5/2019 |

OTHER PUBLICATIONS

English translation of TW-201102676-A, Chen, Jan. 2011 (Year: 2011).*

International Search Report and Written Opinion dated Jul. 13, 2021, received for PCT Application PCT/JP2021/016039, filed on Apr. 20, 2021, 8 pages including English Translation.

* cited by examiner

GRID POINT MESH

SEGMENT SEARCH

TRIGONOMETRIC INTERPOLATION OF
REFERENCE COORDINATE IN REMESH

FIG. 10

INTERPOLATION RATIOS OF TRIGONOMETRIC INTERPOLATION
SUPPOSE OBLIQUE COORDINATE SYSTEM DEFINED BY CENTER
OF GRAVITY G AND MIDPOINTS C1 AND C2 OF SIDES
$G = (P0+P1+P2+P3)/4$
$C_1 = (P1+P3)/2$
$C_2 = (P2+P3)/2$
$P = (1-u-v)G + uC_1 + vC_2$
OBTAIN INTERPOLATION RATIOS u AND v BY CROSS PRODUCT CALCULATION (×):
$u = \{(P-G) \times (C_2-G)\} / \{(C_1-G) \times (C_2-G)\}$
$v = \{(C_1-G) \times (P-G)\} / \{(C_1-G) \times (C_2-G)\}$

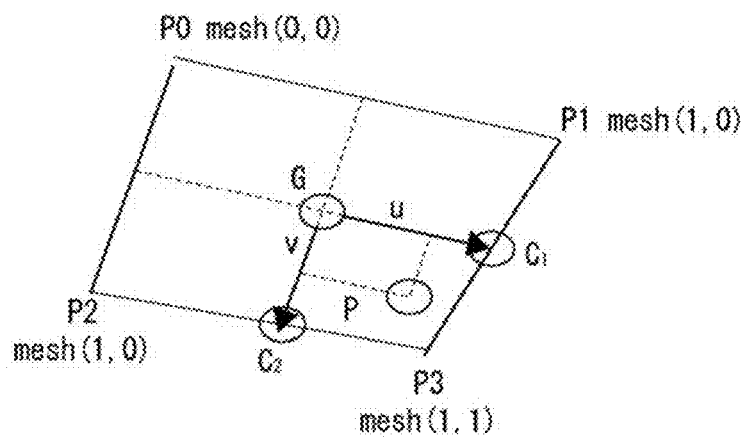

APPLY TRIGONOMETRIC INTERPOLATION
$T_{m0} = (T0+T1+T2+T3)/4$
$T_{m1} = (T1+T3)/2$
$T_{m2} = (T2+T3)/2$
INTERPOLATION VALUE $D = (1-u-v)T_{m0} + uT_{m1} + vT_{m2}$

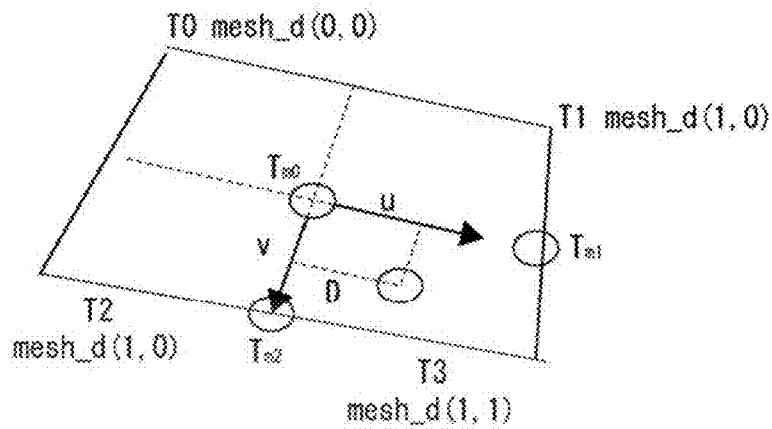

REMESH DATA

REFERENCE COORDINATE INTERPOLATION
BETWEEN PIXELS

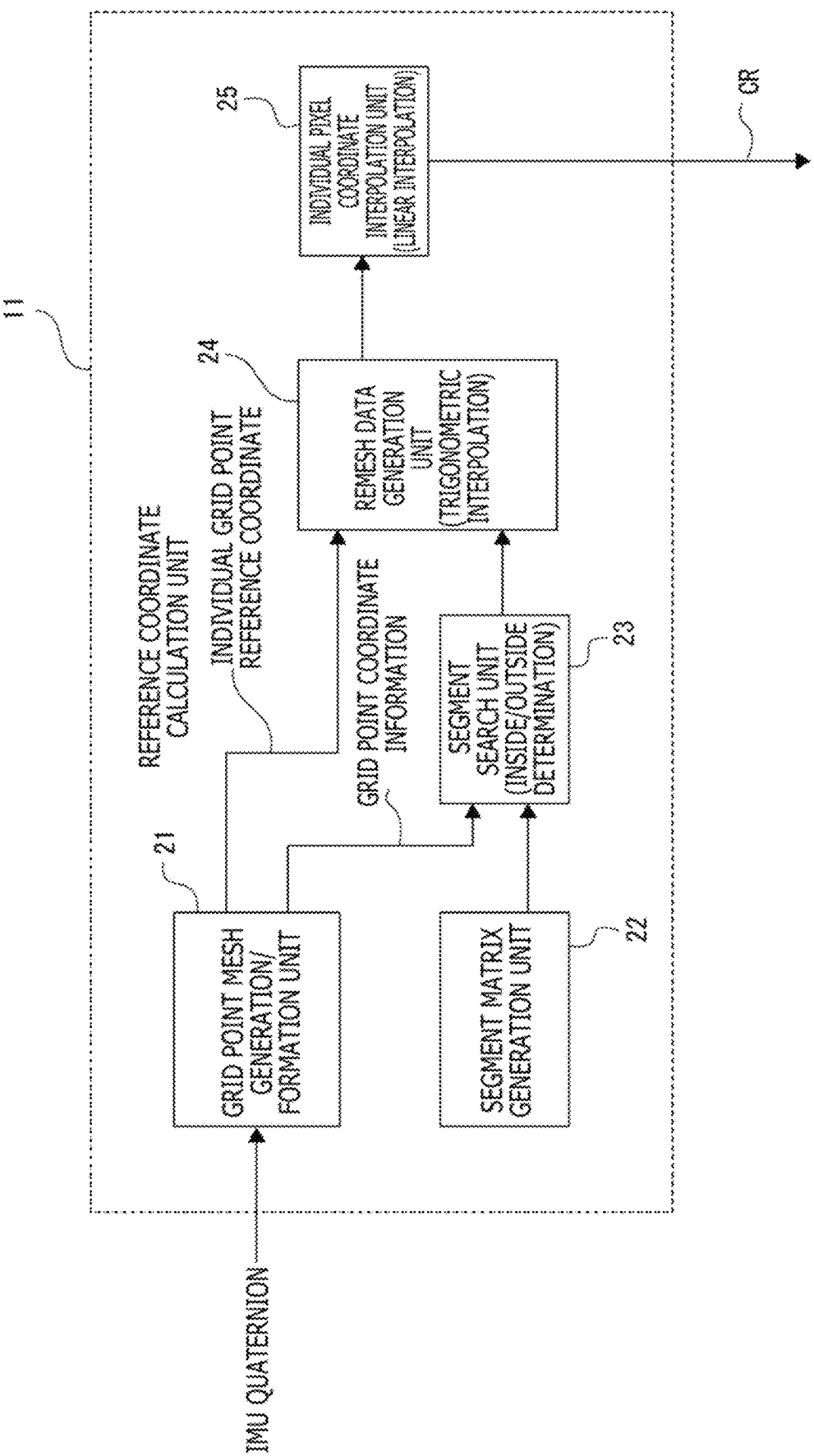
F I G . 1 4

FIG. 24
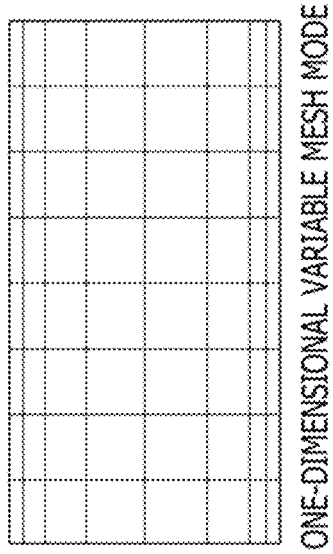
A  FIXED MESH MODE
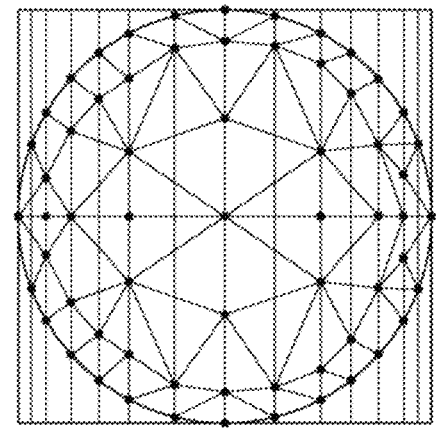
B  ONE-DIMENSIONAL VARIABLE MESH MODE
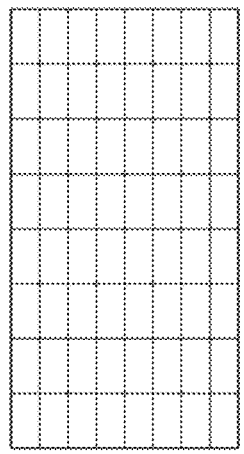
C  TWO-DIMENSIONAL VARIABLE MESH MODE
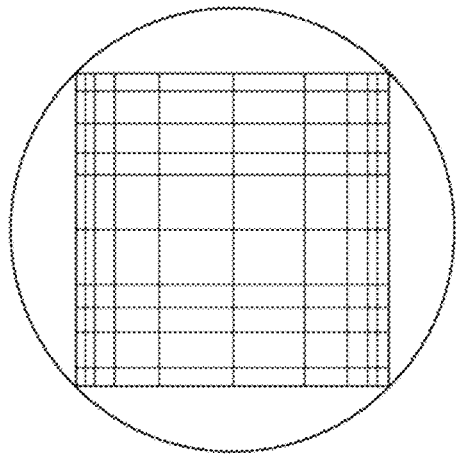
D  FINITE ELEMENT MESH MODE

SIGNAL PROCESSING DEVICE AND SIGNAL PROCESSING METHOD

CROSS-REFERENCE TO RELATED APPLICATIONS

The present application is based on PCT filing PCT/JP2021/016039, filed Apr. 20, 2021, which claims priority to Japanese Application No. 2020-099937, filed Jun. 9, 2020, the entire contents of each are incorporated herein by reference.

TECHNICAL FIELD

The present technology relates to a signal processing device and a method for this device, and particularly to a technology for performing a geometric modulation process for an object defined in a space.

BACKGROUND ART

For example, a geometric modulation process such as deformation, movement, and rotation is performed for an object defined in a space in some fields such as image processing. For example, this object is constituted by multiple polygons as component elements, such as polygon data. In this case, the geometric modulation process generally performed for the object is a coordinate conversion process for coordinate data of each polygon.

Note that PTL 1 identified below is one of associated conventional technologies.

CITATION LIST

Patent Literature

[PTL 1]
JP 2014-66995A

SUMMARY

Technical Problem

Note herein that coordinate conversion is required for each of the elements in a case where the coordinate conversion process is employed to achieve the geometric modulation process performed for the object constituted by the multiple elements as described above. In this case, the computation cost for the geometric modulation process tends to increase.

The present technology has been developed in consideration of the above-mentioned circumstances. An object of the present technology is to reduce the computation cost associated with a geometric modulation process performed for an object.

Solution to Problem

A signal processing device according to the present technology includes an approximate curved surface conversion unit that includes a first stacked autoencoder pretrained on the basis of learning input data constituted by coordinate data acquired for each of multiple elements of an object, and that obtains approximate curved surface data indicating an approximate curved surface of the object in an intermediate layer of the first stacked autoencoder, on the basis of input data constituted by the coordinate data acquired for each of the elements, and a geometric modulation processing unit that includes a second stacked autoencoder having learned by machine learning on the basis of learning input data constituted by the approximate curved surface data and on the basis of training data constituted by a result obtained by coordinate conversion for each of the elements in a geometric modulation process performed for the object, and that performs the geometric modulation process for the approximate curved surface data by using the second stacked autoencoder.

The geometric modulation process refers to a process for changing at least any one of a shape, a position, a posture, or a size of the object. In this case, the change of the posture is a rotation or the like, for example.

According to the above configuration, the geometric modulation process such as deformation, movement, and rotation for the object is performed for the approximate curved surface data which is data obtained by dimensional compression of coordinate data of each element with use of the first stacked autoencoder.

The signal processing device according to the present technology described above can be configured such that, as a stabilization process for a captured image captured by an imaging device, a stabilization process is performed using a grid point mesh that includes multiple grid points arranged in each of a horizontal direction and a vertical direction in an output coordinate system of the captured image and that is given movement information associated with the imaging device for each of the grid points, and such that the object is the grid point mesh.

In this configuration, the geometric modulation process, such as deformation and rotation, performed for the grid point mesh by the stabilization process using the grid point mesh is carried out for the approximate curved surface data of the grid point mesh.

The signal processing device according to the present technology described above can have a configuration which further includes a grid point mesh segment matrix conversion unit that includes a third stacked autoencoder having learned by machine learning on the basis of training data constituted by a result obtained by a segment search process for identifying a square which is included in squares of the grid point mesh having been subjected to the geometric modulation process and which contains a searched segment of segments in a segment matrix formed by dividing, into the segments, an image frame of an output image output by the stabilization process and on the basis of learning input data constituted by the approximate curved surface data having been subjected to the geometric modulation process, and that obtains approximate curved surface data that indicates a correspondence between each of the segments and each of the squares of the grid point mesh in an intermediate layer of the third stacked autoencoder, on the basis of input data constituted by the approximate curved surface data having been subjected to the geometric modulation process.

In this configuration, approximate curved surface data indicating a correspondence between respective segments and squares in the grid point mesh (approximate curved surface data generated by conversion from the grid point mesh into a domain of the segment matrix) can be obtained on the basis of input constituted by the approximate curved surface data of the grid point mesh. That is, when approximate curved surface data corresponding to the segment search result is to be obtained, a need for performing a relatively heavy process for generating approximate curved surface data corresponding to the segment matrix can be eliminated.

The signal processing device according to the present technology described above can have a configuration which further includes a remesh approximate curved surface data generation unit that includes a fourth stacked autoencoder having learned by machine learning on the basis of training data constituted by remesh data obtained by a remesh data generation unit for generating the remesh data indicating the movement information with granularity of the segments with reference to the result of the segment search process and the movement information associated for each of the grid points and on the basis of learning input data constituted by the approximate curved surface data having been subjected to the geometric modulation process and approximate curved surface data obtained by the grid point mesh segment matrix conversion unit, and that obtains approximate curved surface data of the remesh data in an intermediate layer of the fourth stacked autoencoder on the basis of input data constituted by the approximate curved surface data having been subjected to the geometric modulation process, approximate curved surface data obtained by the grid point mesh segment matrix conversion unit, and the movement information associated for each of the grid points.

In this configuration, each process from the geometric modulation process for the grid point mesh to remesh data generation can be consistently achieved by processes each handling approximate curved surface data.

The signal processing device according to the present technology described above can have a configuration which further includes a movement information decoding unit that includes a fifth stacked autoencoder having learned by machine learning on the basis of training data constituted by the movement information obtained for each of pixel positions within the image frame of the output image by an individual pixel movement information calculation unit that obtains the movement information indicating the pixel positions with reference to the remesh data obtained by the remesh data generation unit and on the basis of learning input data constituted by the approximate curved surface data obtained by the remesh approximate curved surface data generation unit and coordinate data designating the pixel positions, and that outputs the movement information in a designated coordinate within the image frame of the output image on the basis of input constituted by the approximate curved surface data obtained by the remesh approximate curved surface data generation unit and the coordinate data designating the pixel positions.

In this configuration, movement information for each output pixel position required for the stabilization process can be appropriately decoded from the approximate curved surface data corresponding to the remesh data.

The signal processing device according to the present technology described above can be configured such that the second stacked autoencoder included in the geometric modulation processing unit learns an algorithm for geometrically modulating the approximate curved surface data for each of different parameter settings of the geometric modulation process, and that the geometric modulation processing unit switches the algorithm according to each of the parameter settings.

In this configuration, a parameter setting change is allowed in the geometric modulation process for the approximate curved surface data.

In addition, a signal processing method according to the present technology includes obtaining approximate curved surface data indicating an approximated curved surface of an object in an intermediate layer of a first stacked autoencoder pretrained on the basis of learning input data constituted by coordinate data acquired for each of multiple elements of the object, the approximate curved surface data being obtained on the basis of input data constituted by the coordinate data acquired for each of the elements, and performing a geometric modulation process for the approximate curved surface data by using a second stacked autoencoder having learned by machine learning on the basis of learning input data constituted by the approximate curved surface data and on the basis of training data constituted by a result obtained by coordinate conversion for each of the elements in the geometric modulation process performed for the object.

The signal processing method described above can also offer advantageous effects similar to those of the signal processing device according to the present technology described above.

BRIEF DESCRIPTION OF DRAWINGS

FIG. 10 is a diagram depicting an example of trigonometric interpolation.

FIG. 14 is a functional block diagram depicting an example of a functional configuration of a reference coordinate calculation unit.

FIG. 24 is an explanatory diagram explaining modifications of the grid point mesh.

DESCRIPTION OF EMBODIMENT

An embodiment according to the present technology will hereinafter be described in the following order with reference to the accompanying drawings.

<1. Overall configuration of imaging device>
<2. Stabilization process>
[2-1. Internal configuration of stabilization processing unit]
[2-2. Stabilization processing method adopted in embodiment]
[2-3. Geometric modulation process of embodiment]
<3. Modifications>
<4. Summary of embodiment>
<5. Present technology>

1. Overall Configuration of Imaging Device

Figure 1:
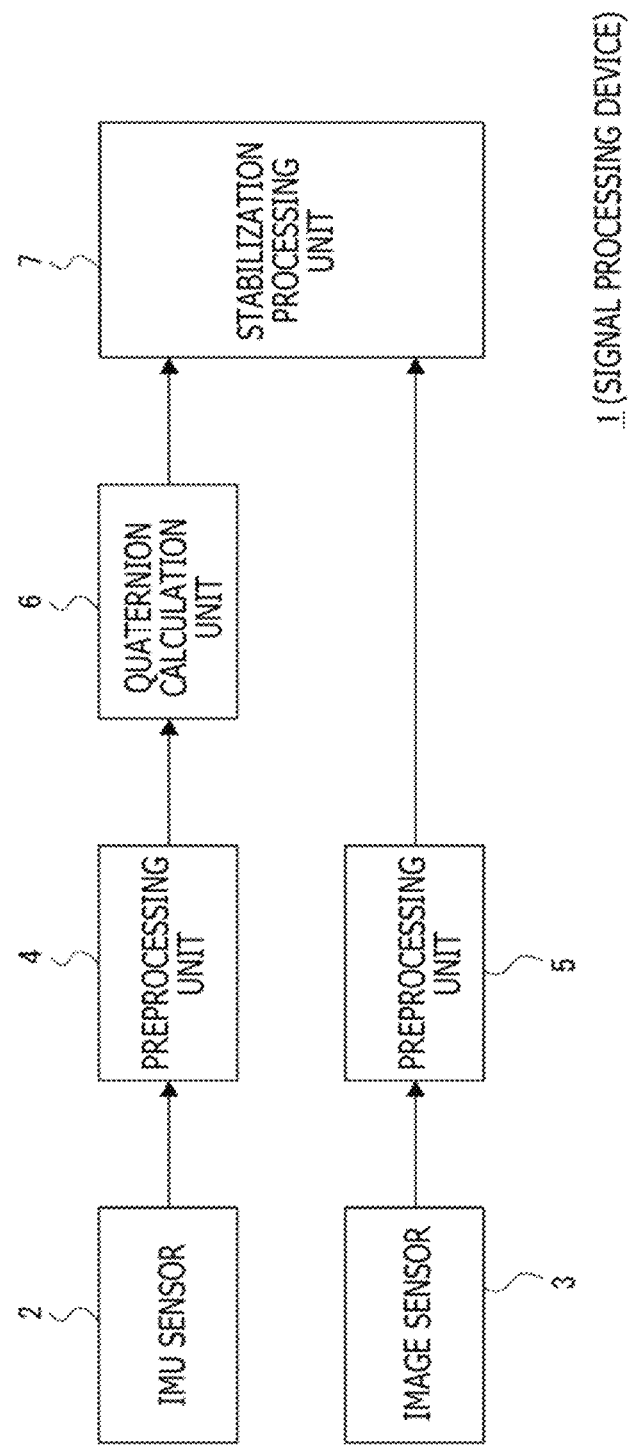
FIG. 1 is a block diagram depicting a configuration example of a signal processing device according to an embodiment of the present technology.

FIG. 1 is a block diagram depicting a configuration example of a signal processing device 1 according to an embodiment of the present technology. Presented herein by way of example is a case where the signal processing device 1 is applied to an imaging device functioning as a digital camera device. Specifically, the signal processing device 1 performs signal processing for achieving electric image stabilization (EIS) for images captured by the imaging device. A process for electric image stabilization will be expressed as a "stabilization process" in the present specification.

As depicted in FIG. 1, the signal processing device 1 includes an IMU (Inertial Measurement Unit) sensor 2, an image sensor 3, a preprocessing unit 4, a preprocessing unit 5, a quaternion calculation unit 6, and a stabilization processing unit 7.

For example, the image sensor 3 is constituted by an image sensor of a CMOS (Complementary Metal Oxide Semiconductor) type, a CCD (Charge Coupled Device) type, or the like, and photoelectrically converts light received by multiple two-dimensionally arranged light reception elements, to acquire a captured image.

The captured image acquired by the image sensor 3 is subjected to predetermined preprocessing performed by the preprocessing unit 5, such as white balance adjustment and demosaicing processing, and then output to the stabilization processing unit 7.

The IMU sensor 2 includes a movement sensor for detecting movement of the imaging device including the signal processing device 1, and outputs a signal indicating a result of detection of this movement. The IMU sensor 2 of the present embodiment includes an acceleration sensor and an angular velocity sensor each having three axes to function as the movement sensor. According to the present embodiment, a detection signal is output from each of the acceleration sensor and the angular velocity sensor (six systems constituted by two sets of three axes) as a signal indicating the result of the movement detection described above.

Each of the signals that are output from the IMU sensor 2 and that indicate the result of the movement detection will hereinafter be collectively referred to as an "IMU signal."

The preprocessing unit 4 performs a predetermined process as preprocessing for the IMU signal input from the IMU sensor 2, and outputs the processed IMU signal to the quaternion calculation unit 6.

The quaternion calculation unit 6 calculates a quaternion indicating a posture of the imaging device, on the basis of the IMU signal input via the preprocessing unit 4.

The quaternion calculated by the quaternion calculation unit 6 (hereinafter expressed as an "IMU quaternion") is input to the stabilization processing unit 7.

The stabilization processing unit 7 performs a stabilization process for a captured image input via the preprocessing unit 5, on the basis of the IMU quaternion input in the above-described manner.

2. Stabilization Process

[2-1. Internal Configuration of Stabilization Processing Unit]

Figure 2:
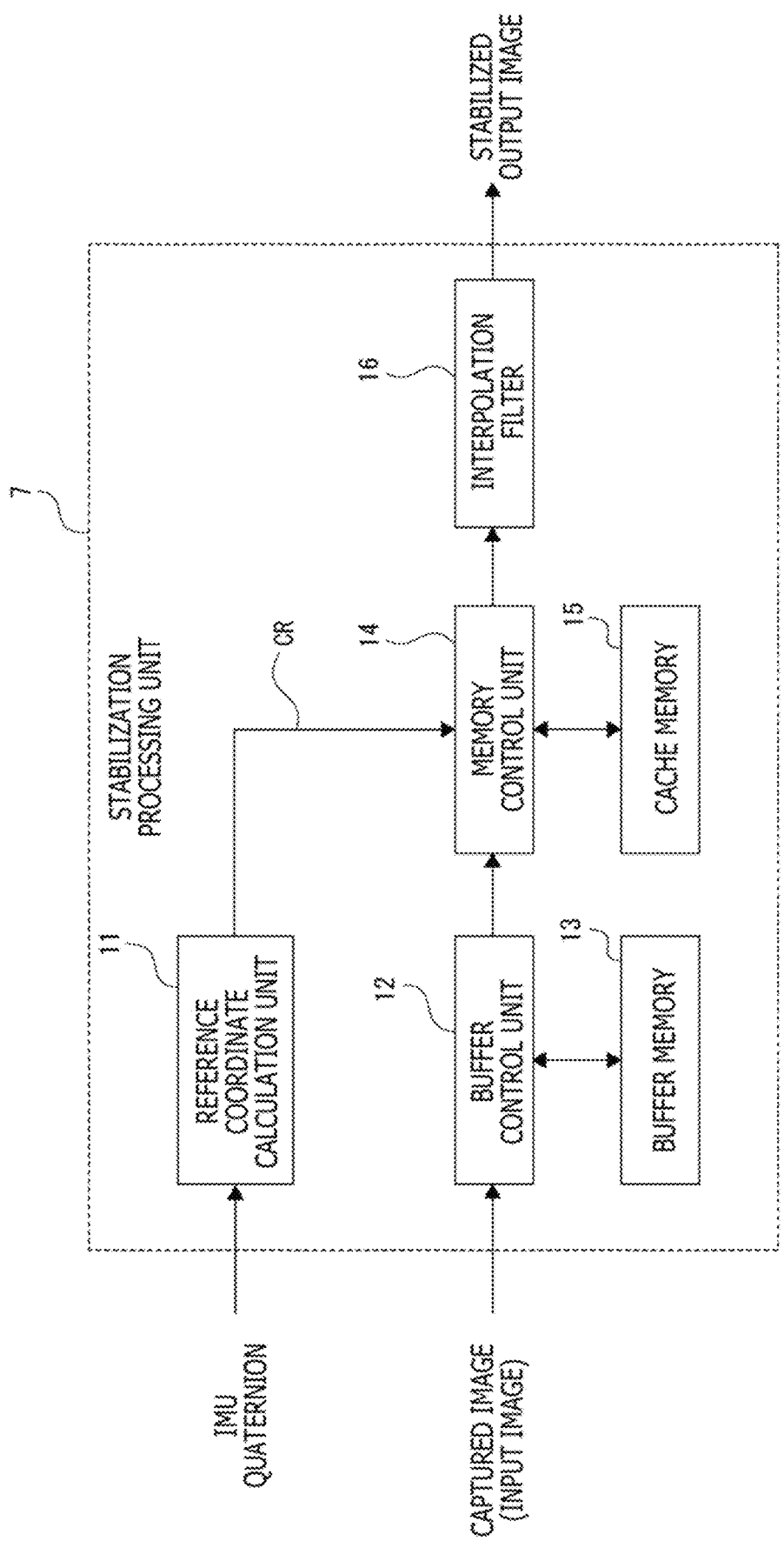
FIG. 2 is a block depicting an internal configuration example of a stabilization processing unit according to the embodiment.

FIG. 2 is a block diagram depicting an internal configuration example of the stabilization processing unit 7.

Note herein that a coordinate system of an input image input to the stabilization processing unit 7, i.e., a captured image preprocessed by the preprocessing unit 5 in the present embodiment, will be expressed as an "input coordinate system" and that a coordinate system of an output image output from the stabilization processing unit 7, i.e., a stabilized output image, will be expressed as an "output coordinate system" in the following description.

The stabilization processing unit 7 cuts out a part of an input image to perform, as electric image stabilization (EIS), a process by which obtains a stabilized output image, and therefore is required to meet a precondition that the number of pixels of the input image is larger than the number of pixels of the output image. Specifically, it is assumed in the present embodiment that the input image is a 4 k image (horizontal pixels: approximately 4,000 pixels, vertical pixels: approximately 2,000 pixels) and that the output image is a 2 k image (horizontal pixels: approximately 2,000 pixels, vertical pixels: approximately 1,000 pixels).

As depicted in FIG. 2, the stabilization processing unit 7 includes a reference coordinate calculation unit 11, a buffer control unit 12, a buffer memory 13, a memory control unit 14, a cache memory 15, and an interpolation filter 16.

An IMU quaternion is input from the quaternion calculation unit 6 to the reference coordinate calculation unit 11. The reference coordinate calculation unit 11 calculates a reference coordinate CR for each of pixels of the output image on the basis of the IMU quaternion.

The reference coordinate CR is information indicating values of positions in the input coordinate system to be used as values at respective pixel positions in the output coordinate system for cutout of the output image from the input image. Specifically, the reference coordinate CR is information indicating values of positions in the input coordinate system to be referred to for each of the pixel positions in the output coordinate system.

The buffer memory 13 is a memory which sequentially buffers the input image for each frame. The buffer control unit 12 controls writing and reading of image data to and from the buffer memory 13.

The cache memory 15 is a memory used for cutout of the output image from the input image. The memory control unit 14 controls writing and reading of image data to and from the cache memory 15.

The memory control unit 14 acquires, via the buffer control unit 12, image data that is included in the image data buffered in the buffer memory 13 and that corresponds to a cutout range, and writes the acquired image data to the cache memory 15.

Moreover, the memory control unit 14 reads, from the image data cached in the cache memory 15 as described above (the image data of the input image), image data which contains multiple pixels including a pixel indicated by the reference coordinate CR in the input coordinate system and pixels surrounding this pixel (e.g., image data containing 4×4=16 pixels if the interpolation filter 16 is Lanczos2 interpolation filter) for each pixel position in the output coordinate system, and outputs the read image data to the interpolation filter 16.

The interpolation filter 16 sequentially receives input of the image data that contains multiple pixels and that is read by the memory control unit 14 for each pixel position in the output coordinate system as described above, and performs an interpolation process using a method described below for each pixel position in the output coordinate system, to obtain values at respective pixel positions in the output coordinate system. In this manner, a stabilized output image is acquired.

[2-2. Stabilization Processing Method Adopted in Embodiment]

A method of the stabilization process adopted in the embodiment will be described with reference to FIGS. 3 to 15.

In the stabilization process, a process for eliminating effects of a tilt and movement of a camera from a captured image is performed.

Figure 3:
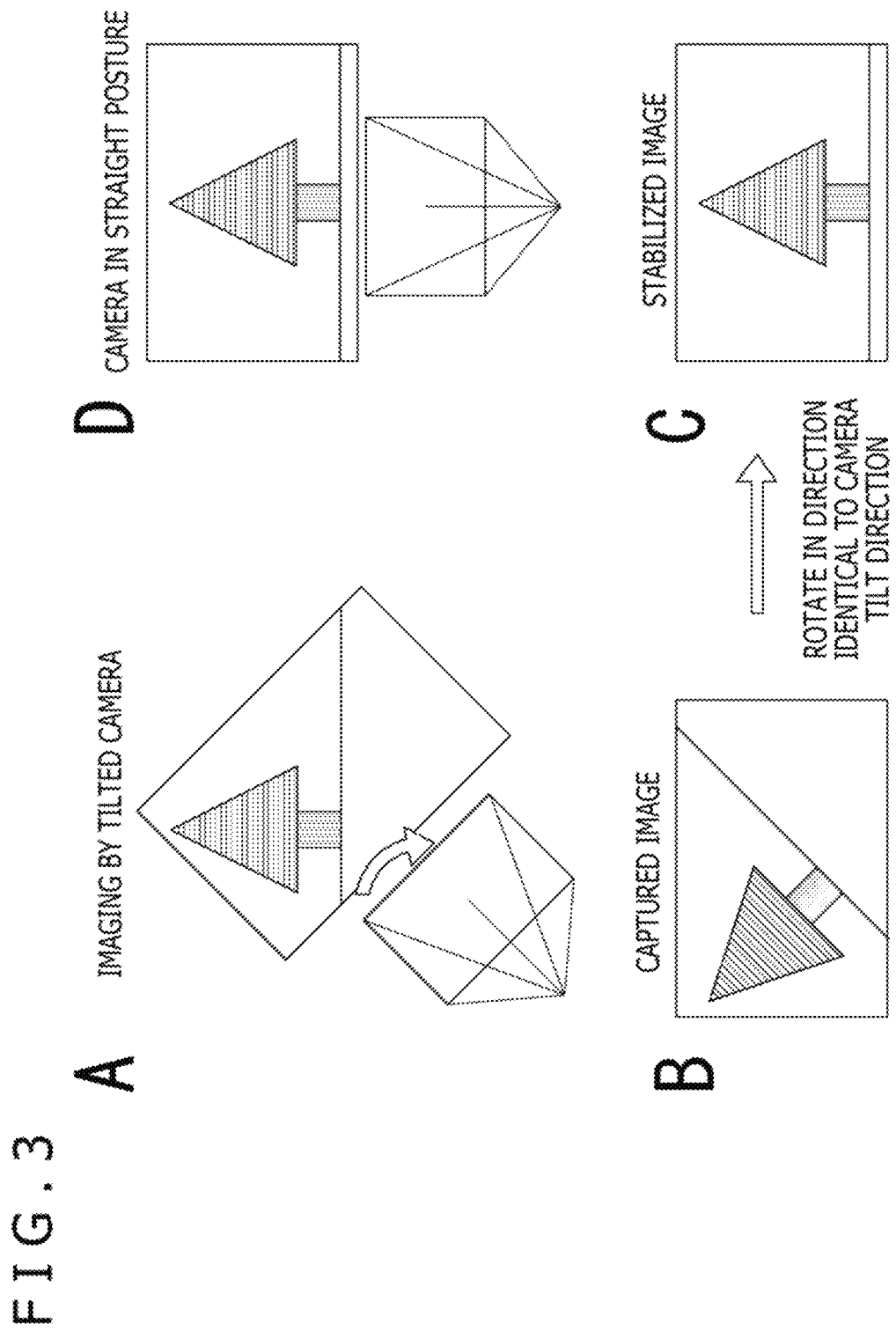
FIG. 3 is a diagram depicting a state of imaging with use of a tilted camera.

FIG. 3 depicts a state of imaging with use of a tilted camera.

The tilted state herein is a state where the camera is tilted in a rolling direction and in a state not maintained in the horizontal and vertical directions. In this case, image data acquired by imaging is in such a state where a subject is tilted as depicted in FIG. 3B.

Even for the image data in such a state, image data in FIG. 3C is acquirable by performing the stabilization process for rotating an image of the image data in the same direction as the direction of the tilt of the camera. This image data in FIG. 3C is similar to image data of an image captured by the camera in a straight posture (a posture not tilted in the rolling direction) as depicted in FIG. 3D.

This rotation relative to the tilt of the posture made in such manner is achieved by rotating a pixel range for cutout on the basis of posture information when an output image smaller in size than an input image is cut out from the input image.

Figure 4:
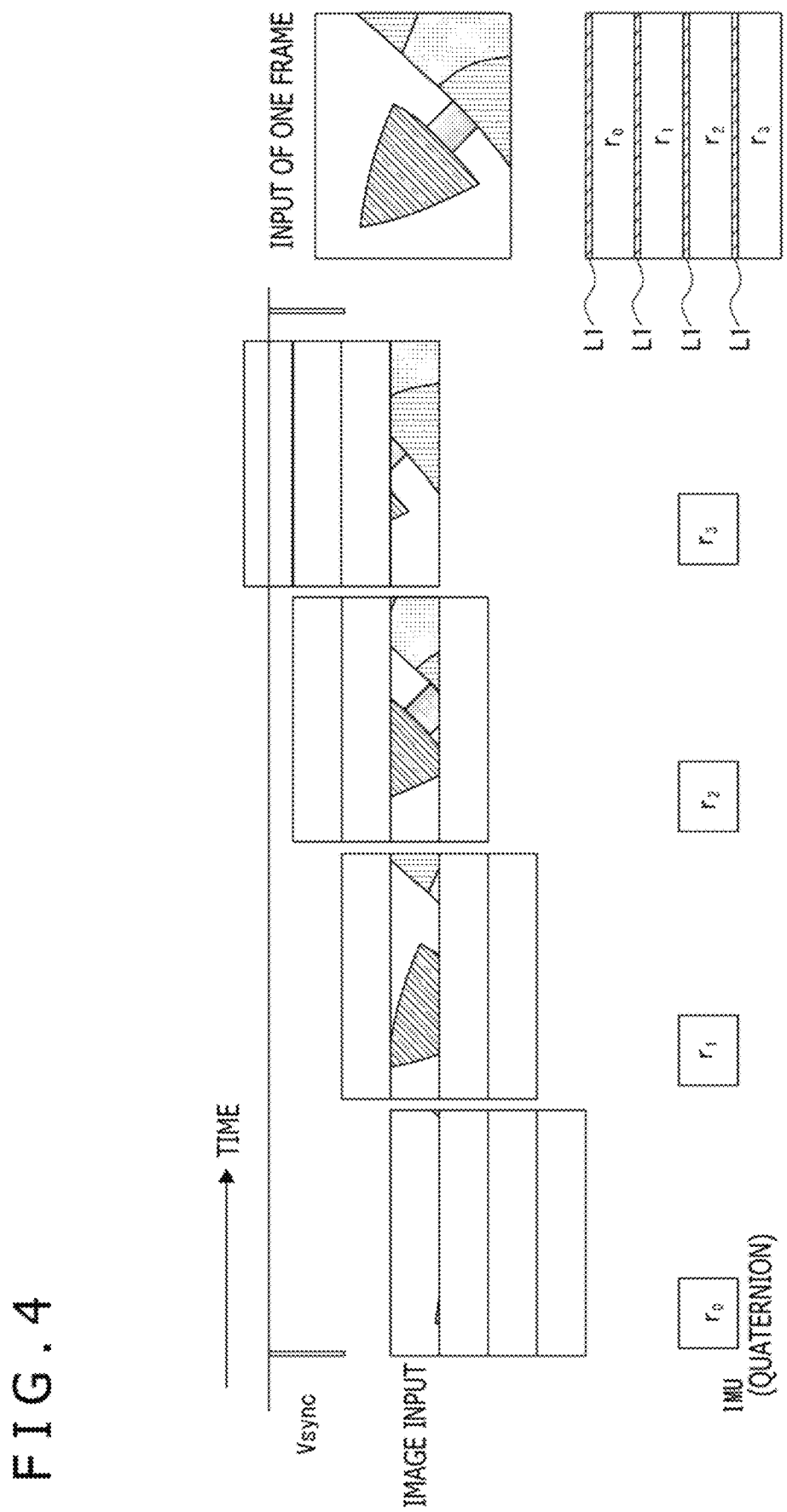
FIG. 4 is a diagram depicting a relation between IMU quaternions and image input.

FIG. 4 depicts a relation between IMU quaternions and image input.

During imaging with a camera which is moving, the IMU quaternion changes even in a period of one frame.

Assuming that IMU data is acquired for every multiple lines, for example, the IMU quaternion (indicated by r0, r1, r2, and r3 in FIG. 4) is also acquired for every few lines as depicted in FIG. 4. Presented herein is a case where the four IMU quaternions are acquired in a period of one frame indicated by a vertical synchronized signal Vsync. However, this case is given only by way of example for convenience of explanation. In this case, the IMU quaternion r0 corresponds to an uppermost ¼ image of the frame, the IMU quaternion r1 corresponds to a subsequent ¼ image, the IMU quaternion r2 corresponds to a subsequent ¼ image, and the IMU quaternion r3 corresponds to a final ¼ image.

Each of "virtual lines L1" in FIG. 4 herein indicates a virtual line corresponding to the IMU quaternion having the same value.

According to a conventional method, the multiple virtual lines L1 each corresponding to the same value of the IMU quaternion are assumed on a premise that IMU data is acquired multiple times in the period of one frame as described above. Under this assumption, the reference coordinate CR is applied for each of pixel positions in the output coordinate system according to each of the virtual lines L1, and an input image based on the reference coordinates CR thus applied is cut out to acquire a stabilized image.

However, it has been clarified that the stabilization process using the virtual lines L1 as described above is unable to achieve sufficient performance of stabilization.

Figure 5:
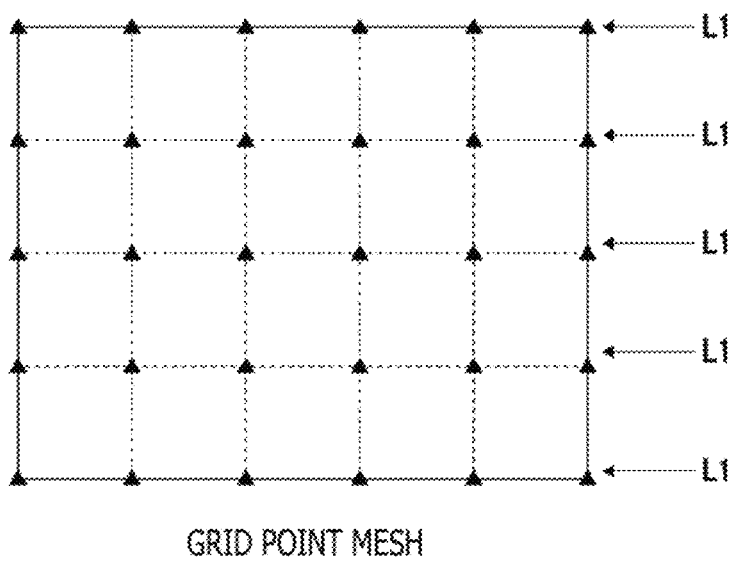
FIG. 5 is a diagram depicting an example of a grid point mesh.

Accordingly, the present embodiment adopts a method which uses a grid point mesh as depicted in FIG. 5 by way of example.

The grid point mesh has multiple grid points arranged in both the horizontal direction and the vertical direction (indicated by black triangle marks in FIG. 5).

The grid point mesh includes multiple grid point rows arranged in the vertical direction. Each of the grid point rows is constituted by multiple grid points arranged in the horizontal direction. In other words, it can be said that the grid point mesh includes multiple grid point columns arranged in the horizontal direction. Each of the grid point columns is constituted by multiple grid points arranged in the vertical direction.

The respective grid point rows included in the grid point mesh correspond to the virtual lines L1 indicated in FIG. 4. An IMU quaternion based on IMU data acquired at timing of the corresponding row position is defined for each of the grid point rows in association with each other. In other words, the values acquired for the IMU quaternions associated with the respective grid points are equalized for each grid point row.

Note that the example presented in FIG. 5 is such a case where the number of grid points in each of the grid point rows of the grid point mesh is 6, i.e., the number of divisions in the horizontal direction is 5 and where the number of grid points in each of the grid point columns is 5, i.e., the number of divisions in the vertical direction is 4. However, the respective numbers of divisions in the grid point mesh in the horizontal direction and the vertical direction are not limited to these numbers.

The positions of the respective grid points in the grid point mesh are managed as positions in the input coordinate system to handle these positions in correspondence with the acquisition timing of IMU data.

The reference coordinate calculation unit 11 converts these positions of the grid points in such an input coordinate system into positions in the output coordinate system.

Figure 6:
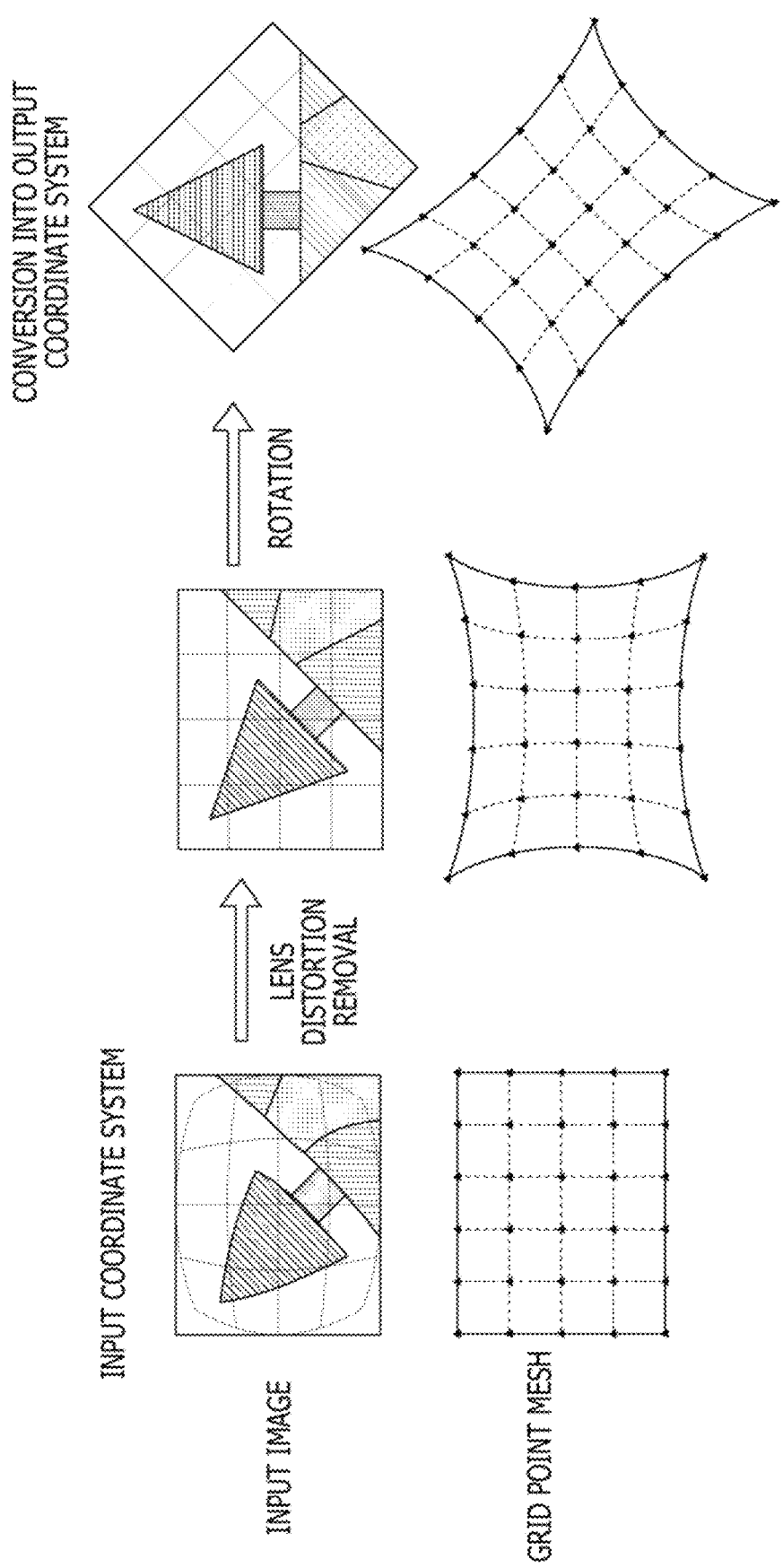
FIG. 6 is an explanatory diagram explaining coordinate conversion of the grid point mesh.
Figure 7:
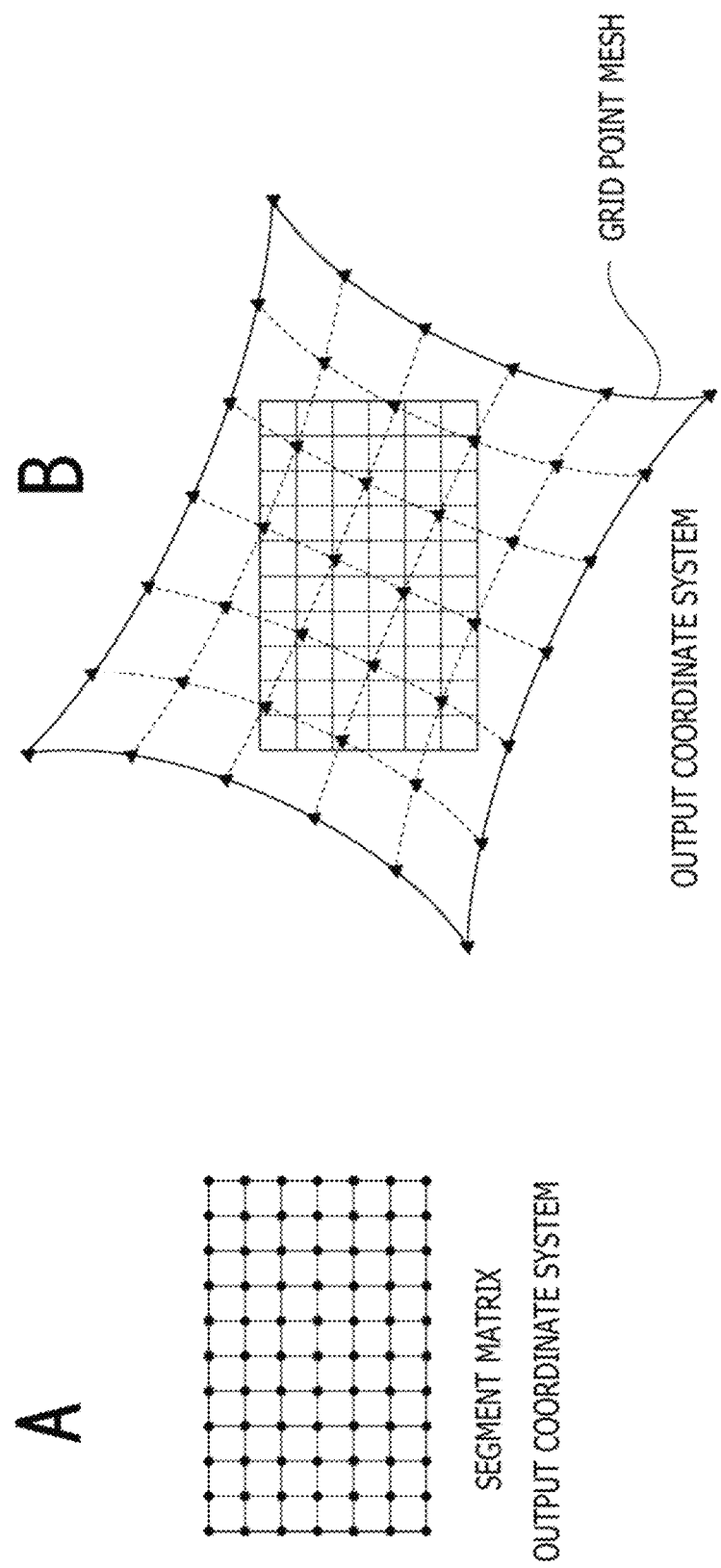
FIG. 7 is a diagram for explaining a relation between a segment matrix and the grid point mesh.

FIG. 6 is an explanatory diagram explaining coordinate conversion of the grid point mesh.

For converting positions of the grid points into positions in the output coordinate system, a change similar to a change given to the input image is only required to be added to the grid point mesh. Specifically, as depicted in FIG. 6, first, a lens distortion removal process is performed for the grid point mesh to establish correspondence with a lens distortion removal process performed for the input image, and then the grid point mesh is rotated in the same direction as the direction of the camera. In this manner, conversion into the output coordinate system is achievable.

The stabilization process according to the present embodiment uses the grid point mesh converted into the output coordinate system as described above and a segment matrix depicted in FIG. 7A.

The segment matrix represents positions of respective segments (indicated by black circle marks in FIG. 6) produced by dividing the output image (an image frame of the output image formed by the stabilization process) into predetermined segments. It is assumed in the present embodiment that one segment has a size of 64 pixels×64 pixels, for example.

FIG. 7B depicts the grid point mesh having been subjected to coordinate conversion into the output coordinate system, and the segment matrix overlapped with the grid point mesh in the output coordinate system.

The grid point mesh has a size larger than the size of the segment matrix because the size of the input image is larger than the size of the output image as described above.

By the conversion of the grid point mesh into the output coordinate system, a positional relation between the positions (black circle marks) of the respective segments in the segment matrix and the respective grid points in the grid point mesh becomes identifiable as depicted in FIG. 7B.

The reference coordinate calculation unit 11 acquires the reference coordinate CR for each segment on the basis of the positional relation between the respective segments and the grid points in the output coordinate system.

Figure 8:
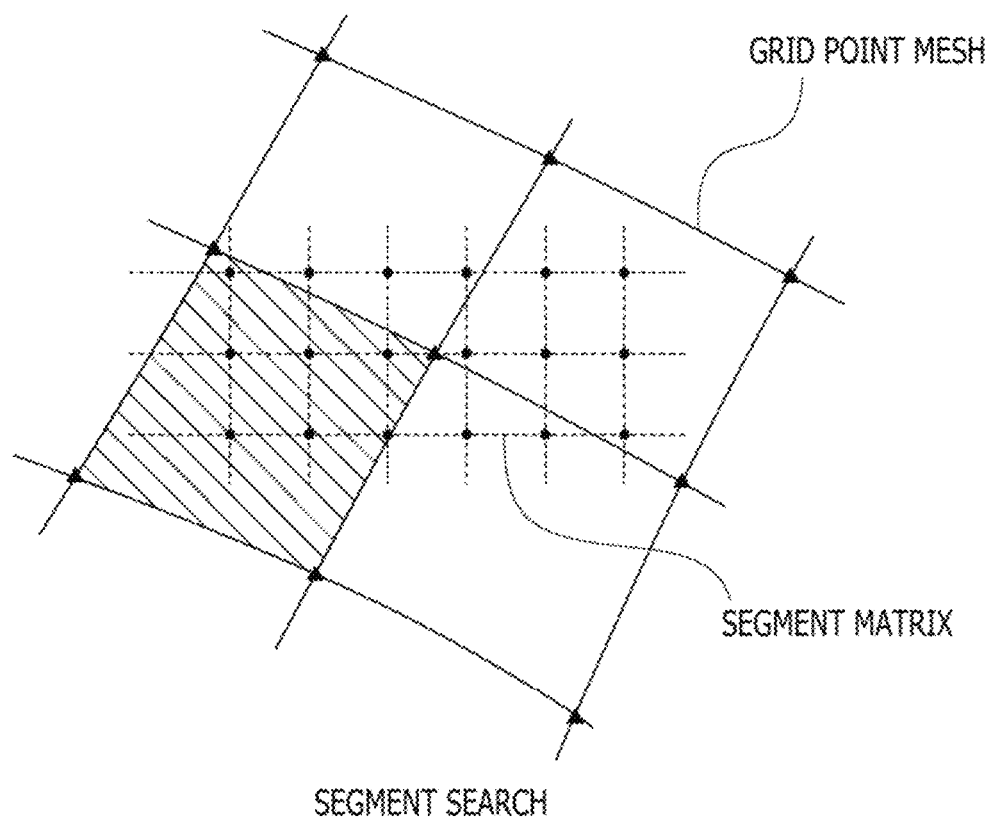
FIG. 8 is an explanatory diagram explaining segment search according to the embodiment.

For this purpose, first, the reference coordinate calculation unit 11 carries out segment search as depicted in FIG. 8.

The segment search is a process for recognizing a square that is included in the grid point mesh and that contains a segment position indicated by a black circle mark for each of the segments constituting the segment matrix.

Specifically, the reference coordinate calculation unit 11 identifies the segment position contained in the corresponding square, on the basis of inside/outside determination for each of the squares included in the grid point mesh. This inside/outside determination identifies the square that is included in the grid point mesh and that contains the corresponding segment position for each of the segment positions.

The reference coordinate CR for each of the segment positions can be obtained on the basis of IMU quaternions at four grid points containing the corresponding segment position. It is assumed in the following description that information indicating the reference coordinate CR calculated from the corresponding IMU quaternions is given for each of the grid points in the grid point mesh in association with each other. The reference coordinate CR given for each of the grid points in association with each other in such a manner will hereinafter be referred to as a "grid point reference coordinate."

Figure 9:
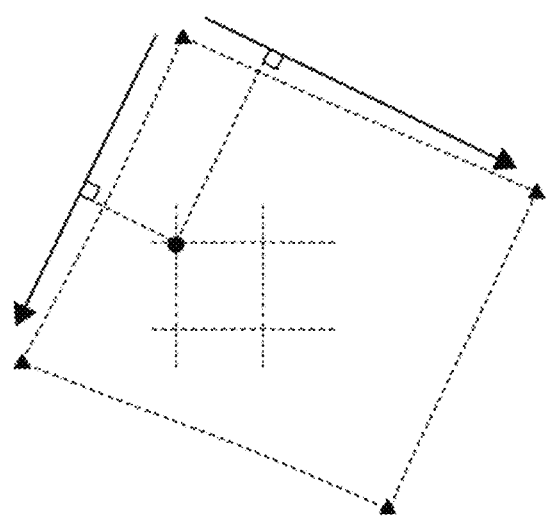
FIG. 9 is an explanatory diagram explaining trigonometric interpolation performed for obtaining a reference coordinate for each segment position.

The reference coordinate calculation unit 11 calculates the reference coordinate CR for each of the segment positions by using trigonometric interpolation depicted in FIG. 9 after identifying, on the basis of the inside/outside determination (segment search), each square that is included in the grid point mesh and that contains the corresponding one of the segment positions.

Specifically, this trigonometric interpolation uses information indicating the coordinate of the segment position, information indicating the coordinates of the three grid points included in the four grid points of the square containing this segment position in the grid point mesh, and information indicating the grid point reference coordinates associated with these grid points.

For example, this trigonometric interpolation is achievable by procedures depicted in FIG. 10.

Figure 11:
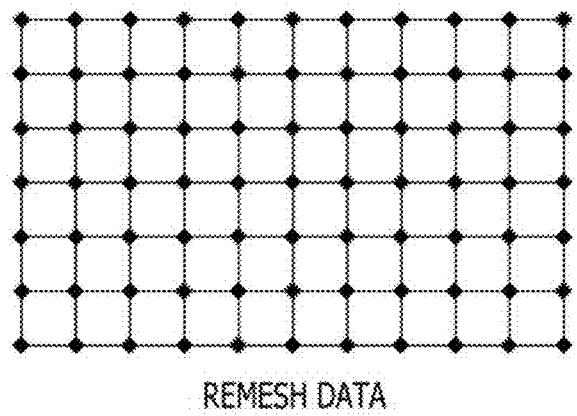
FIG. 11 is an explanatory diagram of remesh data.

Remesh data depicted in FIG. 11 is acquirable by obtaining the reference coordinates CR at the respective segment positions with use of the trigonometric interpolation. This remesh data is data indicating the reference coordinates CR at the respective positions with segment granularity in the output coordinate system. In FIG. 11, each of the reference coordinates CR at the respective positions with the segment granularity, i.e., each of the reference coordinates CR calculated for each of the segment positions is indicated by a black rhombus mark.

The reference coordinate calculation unit 11 obtains the reference coordinate CR for each of the pixel positions in the output image on the basis of the remesh data described above.

Figure 12:
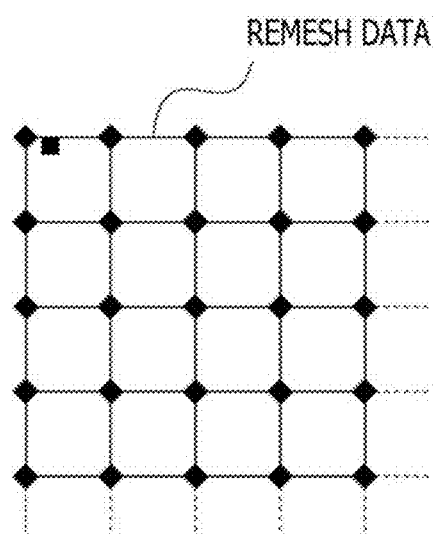
FIG. 12 is a conceptual diagram depicting how to obtain a reference coordinate for each pixel position on the basis of remesh data.

FIG. 12 is a conceptual diagram depicting how to obtain the reference coordinate CR for each pixel position on the basis of remesh data. In FIG. 12, the reference coordinate CR for each pixel position is indicated by a black square mark.

According to the present embodiment, each of the reference coordinates CR is obtained on the basis of linear interpolation (bilinear interpolation) using remesh data (reference coordinates CR with segment granularity). Specifically, each of the reference coordinates CR is obtained on the basis of bilinear interpolation using the reference coordinates CR of respective points at four corners of the segment containing a target pixel position.

In this case, bilinear interpolation is adopted instead of trigonometric interpolation described above because bilinear interpolation is lighter than trigonometric interpolation and similarly obtains sufficient accuracy from data once converted into remesh data. However, in a case where trigonometric interpolation is incorporated as a hardware circuit in an LSI (Large Scale Integrated circuit), trigonometric interpolation of all pixels with use of this block is considered to be more advantageous than bilinear interpolation incorporated as a separately provided bilinear interpolation circuit, in view of a circuit scale.

A value of a position to be referred to in the input coordinate system can be identified for each pixel position by obtaining the reference coordinate CR for each pixel position in the output image. However, each of the reference coordinates CR is calculated by the interpolation process based on remesh data as described above. In this case, each of the reference coordinates CR may have not an integer value (i.e., a value obtained for each pixel in the input image) but a value containing a decimal. Accordingly, the interpolation filter 16 depicted in FIG. 2 is used for rendering the output image on the basis of the reference coordinates CR.

Figure 13:
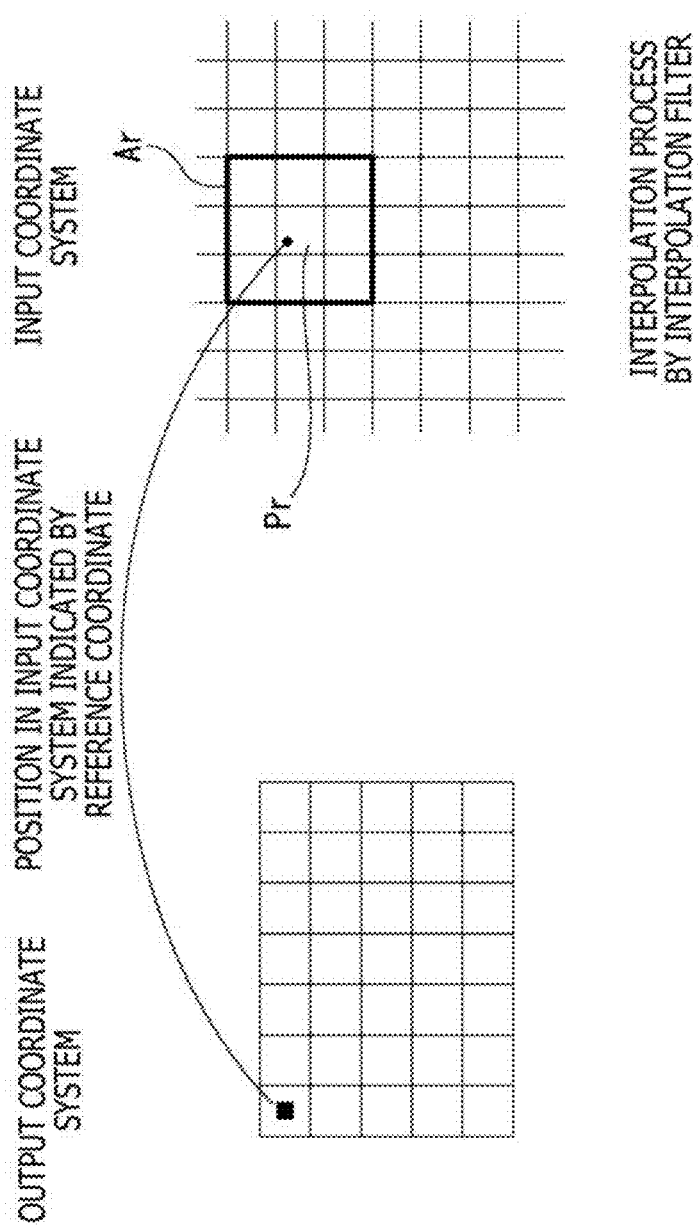
FIG. 13 is an explanatory diagram explaining an interpolation process performed by an interpolation filter.

FIG. 13 is an explanatory diagram of an interpolation process performed by the interpolation filter 16.

Pixel values of multiple pixels necessary for rendering of each output pixel are sequentially input to the interpolation filter 16 from the input image (pixel values) cached in the cache memory 15 under control by the memory control unit 14. Specifically, the pixel values of the multiple pixels necessary for rendering of each output pixel are data in a region constituted by multiple pixels including a pixel which contains a position in the input coordinate system indicated by the reference coordinate CR of the corresponding output pixel, and pixels surrounding the corresponding pixel (see a region Ar surrounded by a thick frame in the FIG. 13).

In the following description, the pixel containing the position in the input coordinate system indicated by the reference coordinate CR will hereinafter be referred to as a "reference pixel Pr" for convenience of explanation. Moreover, the pixel region that includes the reference pixel Pr and the pixels surrounding the reference pixel Pr and that is necessary for rendering will be referred to as a "reference region Ar." The reference region Ar is a region corresponding to m pixels×m pixels (m: 3 or larger natural number) around the reference pixel Pr. In addition, while the reference region Ar is assumed as a region corresponding to 3 pixels×3 pixels=9 pixels around the reference pixel Pr in FIG. 13, this definition is presented only by way of example for convenience of explanation. The size of the reference region Ar is not limited to this size.

The interpolation filter 16 obtains a value of a position indicated by the reference coordinate CR for a processing target output pixel by performing an interpolation process using values of respective pixels included in the reference region Ar. For example, a Lanczos filter is employed for this interpolation process. Specifically, it is considered to use a Lanczos2 filter, or a hybrid filter blended with a gaussian filter in view of prevention of aliasing. This hybrid filter is effective for Lanczos2 interpolation in a RAW format having RGGB arrangement as an image format, for example, and is used for prevention of aliasing particularly in a high frequency band.

The interpolation filter 16 sequentially performs this interpolation process for each output pixel. In this manner, a stabilized output image is acquired.

Note that the rendering of the stabilized output image can include luminance adjustment for lens shading as well as the calculation of pixel values based on the interpolation process performed by the interpolation filter 16 as described above. In that case, luminance control information or the like as well as the reference coordinate CR is given to each grid point to achieve gain adjustment in addition to the interpolation process.

Similarly, local motion information obtained by a SLAM technology for self-position estimation, depth information acquired by a depth sensor, such as a ToF sensor, obtaining an image depth, or the like may be given to each grid point for the purpose of application to coordinate correction having a high degree of freedom on a grid point basis, depth correction, or others.

FIG. 14 is a functional block diagram depicting an example of a functional configuration of the reference coordinate calculation unit 11 depicted in FIG. 2.

As depicted in FIG. 14, the reference coordinate calculation unit 11 has functions of a grid point mesh generation/formation unit 21, a segment matrix generation unit 22, a segment search unit 23, a remesh data generation unit 24, and an individual pixel coordinate interpolation unit 25.

The grid point mesh generation/formation unit 21 performs a process for forming a grid point mesh, such as generation of a grid point mesh and rotation for conversion into the output coordinate system described above (see FIG. 6).

Figure 15:
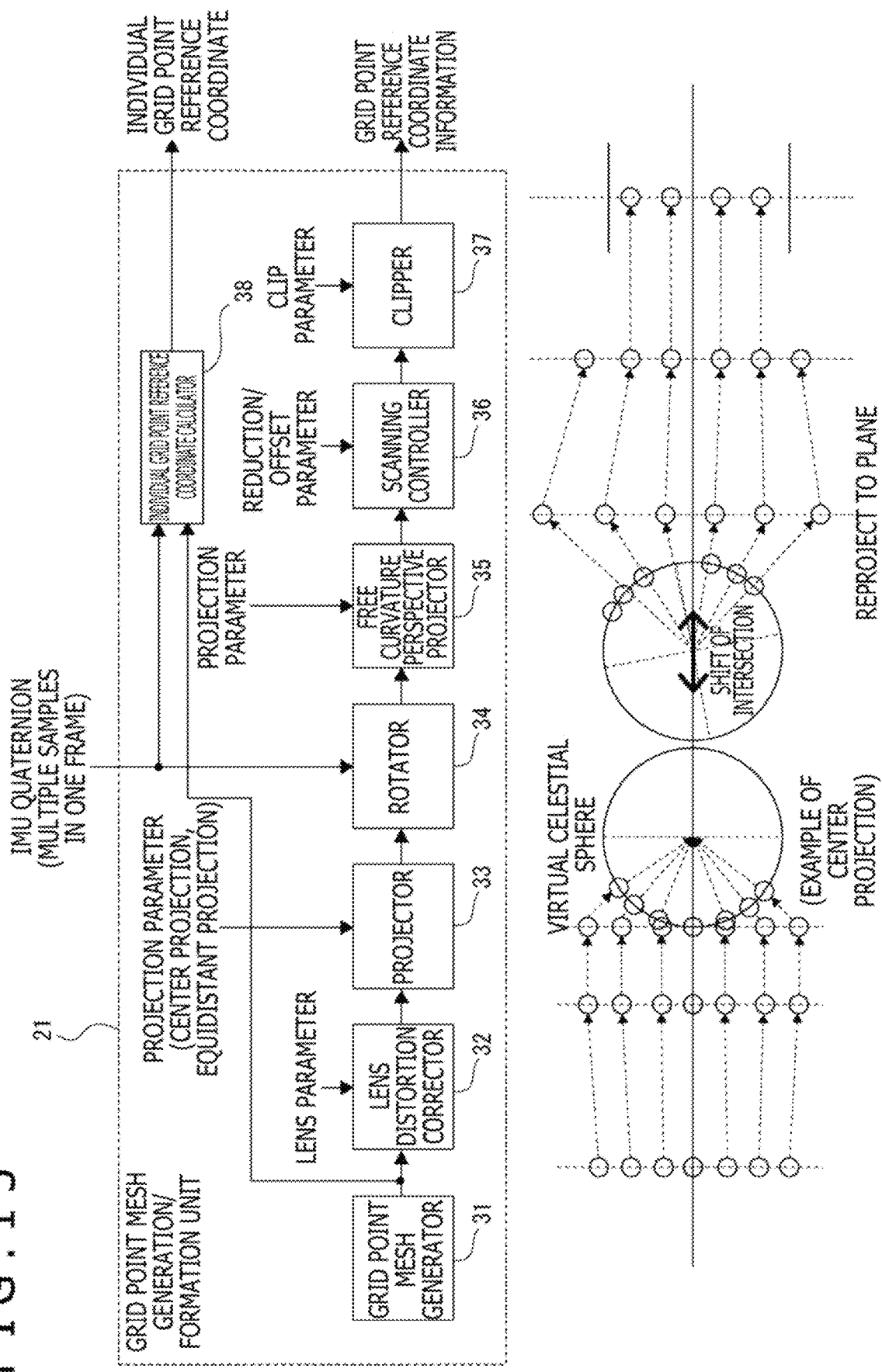
FIG. 15 is a diagram for explaining a functional configuration of a grid point mesh generation/formation unit.

FIG. 15 is a diagram for explaining a functional configuration of the grid point mesh generation/formation unit 21. Note that FIG. 15 includes a conceptual diagram schematically presenting processes for forming a grid point mesh, together with a functional configuration of the grid point mesh generation/formation unit 21.

As depicted in FIG. 15, the grid point mesh generation/formation unit 21 has functions of a grid point mesh generator 31, a lens distortion corrector 32, a projector 33, a rotator 34, a free curvature perspective projector 35, a scanning controller 36, a clipper 37, and an individual grid point reference coordinate calculator 38.

The grid point mesh generation/formation unit 21 generates and forms a grid point mesh.

The lens distortion corrector 32 performs a lens distortion correction process for the grid point mesh on the basis of lens parameters.

The projector 33 projects the grid point mesh to a virtual celestial sphere after the grid point mesh is subjected to the lens distortion correction process by the lens distortion corrector 32. For example, center projection, equidistant projection, and the like are adoptable as a projection method (the conceptual diagram in FIG. 15 depicts an example of center projection). The projector 33 according to the present embodiment performs a projection process based on either the center projection or the equidistant projection mentioned above, on the basis of projection parameters.

The rotator 34 rotates the grid point mesh on the basis of an IMU quaternion after the grid point mesh is projected to the virtual celestial sphere by the projector 33. This rotation achieves an operation for rotating the grid point mesh in the same direction as the direction of the camera as described above. This rotation is made with reference to information that is contained in the IMU quaternion and that indicates a rotation amount (a rotation amount parameter).

The free curvature perspective projector 35 projects (reprojects) the grid point mesh rotated by the rotator 34 to a plane by free curvature perspective projection, on the basis of a projection parameter. The free curvature perspective projection applied herein can offer a desired lens effect for the reprojected grid point mesh, thereby achieving picture creation of the output image. The projection parameter is a parameter for designating a mode of such a lens effect.

The scanning controller 36 performs an affine transformation process for the grid point mesh projected to the plane, to achieve an appropriate setting for scale reduction and an offset change. The scanning controller 36 achieves these scale reduction setting and offset change on the basis of a predetermined parameter as a reduction/offset parameter designated beforehand, for example.

The clipper 37 performs a clip process for the grid point mesh processed by the scanning controller 36, on the basis of a clip parameter, to prevent an excess of data over fixed-point accuracy. In addition, in a case where any of the grip points exceed a fixed-point data range, the segments to which these grip points belong are all designated as invalid segments, and subjected to an exceptional process for black screen output in a later stage.

This clip process performed by the clipper 37 defines coordinates of the respective grid points in the output coordinate system.

The individual grid point reference coordinate calculator 38 calculates reference coordinates of the individual grid points (grid point reference coordinates described above) in the grid point mesh on the basis of IMU quaternions.

The description now returns to FIG. 14.

As described above, coordinate information associated with the individual grid points in the output coordinate system and defined by the clip process performed by the clipper 37 is supplied from the grid point mesh generation/formation unit 21 to the segment search unit 23 as individual grid point coordinate information.

Moreover, the individual grid point reference coordinates obtained by the individual grid point reference coordinate calculator 38 are supplied from the grid point mesh generation/formation unit 21 to the remesh data generation unit 24.

The segment search unit 23 performs the segment search described above (inside/outside determination: see FIGS. 7 and 8), on the basis of the segment matrix generated by the segment matrix generation unit 22 and the individual grid point coordinate information supplied from the grid point mesh generation/formation unit 21. As a result, four grid points containing the corresponding segment position are identified for each segment position included in the segment matrix.

The remesh data generation unit 24 performs trigonometric interpolation described above (see FIGS. 9 and 10) for each segment position, on the basis of information that indicates individual grid point reference coordinates and that is supplied from the grid point mesh generation/formation unit 21 and information indicating a segment search result obtained by the segment search unit 23, to generate remesh data (see FIG. 11). As described above, remesh data may be also expressed as the reference coordinates CR with segment granularity.

The remesh data generation unit 24 outputs the generated remesh data to the individual pixel coordinate interpolation unit 25.

The individual pixel coordinate interpolation unit 25 obtains the reference coordinate CR for each of the pixel positions in the output image on the basis of the remesh data. As described above, the reference coordinates CR of the respective pixel positions are obtained by bilinear interpolation based on the remesh data.

The individual pixel coordinate interpolation unit 25 outputs the reference coordinates CR of the respective pixel positions to the memory control unit 14 depicted in FIG. 2.

The memory control unit 14 depicted in FIG. 2 controls data writing from the buffer memory 13 to the cache memory 15 on the basis of the reference coordinates CR.

Moreover, the memory control unit 14 sequentially reads, from the cache memory 15, data of the reference region Ar (see FIG. 13) containing the corresponding pixel position for each of pixel positions in the output image, on the basis of the reference coordinates CR, and outputs the read data to the interpolation filter 16.

Consequently, the interpolation filter 16 sequentially performs an interpolation process using the data of the reference region Ar for each of the pixel positions in the output image to obtain a stabilized output image.

As described above, for obtaining the reference coordinate CR for each pixel position in the output image, the stabilization processing method adopted in the present embodiment ensures consistency with the output coordinate system not on the basis of only one-dimensional information constituted by the virtual lines L1 as conventionally adopted, but on the basis of two-dimensional information constituted by the grid point mesh.

This method can raise accuracy of the reference coordinates CR, and also improve performance of the stabilization process.

[2-3. Geometric Modulation Process of Embodiment]

Note herein that the geometric modulation process for the grid point mesh, such as the lens distortion correction process (i.e., deformation of the grid point mesh) performed by the lens distortion corrector 32, the rotation by the rotator 34, and the affine transformation process (i.e., movement or scale enlargement/reduction of the grid point mesh) performed by the scanning controller 36, is performed in the present embodiment as apparent with reference to FIG. 15.

The geometric modulation process herein refers to a process for changing at least any one of a shape, a position, a posture, or a size of an object. The object mentioned herein is constituted by multiple elements. The grid point mesh is presented as an example of this object. That is, the grid point mesh is considered as an object constituted by multiple grid points as elements. Alternatively, in a case where one square surrounded by four adjoining grid points in the grid point mesh is designated as a polygon, the grid point mesh is also considered as an object constituted by multiple polygons as elements.

As touched upon above, the geometric modulation process for an object constituted by multiple elements is generally performed as a coordinate conversion process for each element. However, it is not desirable to apply coordinate conversion to each of the elements, in terms of a rise of the computation cost required by the geometric modulation process.

Accordingly, the present embodiment adopts a method which converts the grid point mesh as an object into an approximate curved surface with use of a function of self-taught learning based on a stacked autoencoder (hereinafter referred to as an "SAE") used in the field of AI (Artificial Intelligence) and which performs the geometric modulation process for the grid point mesh in the form of approximate curved surface data.

Figure 16:
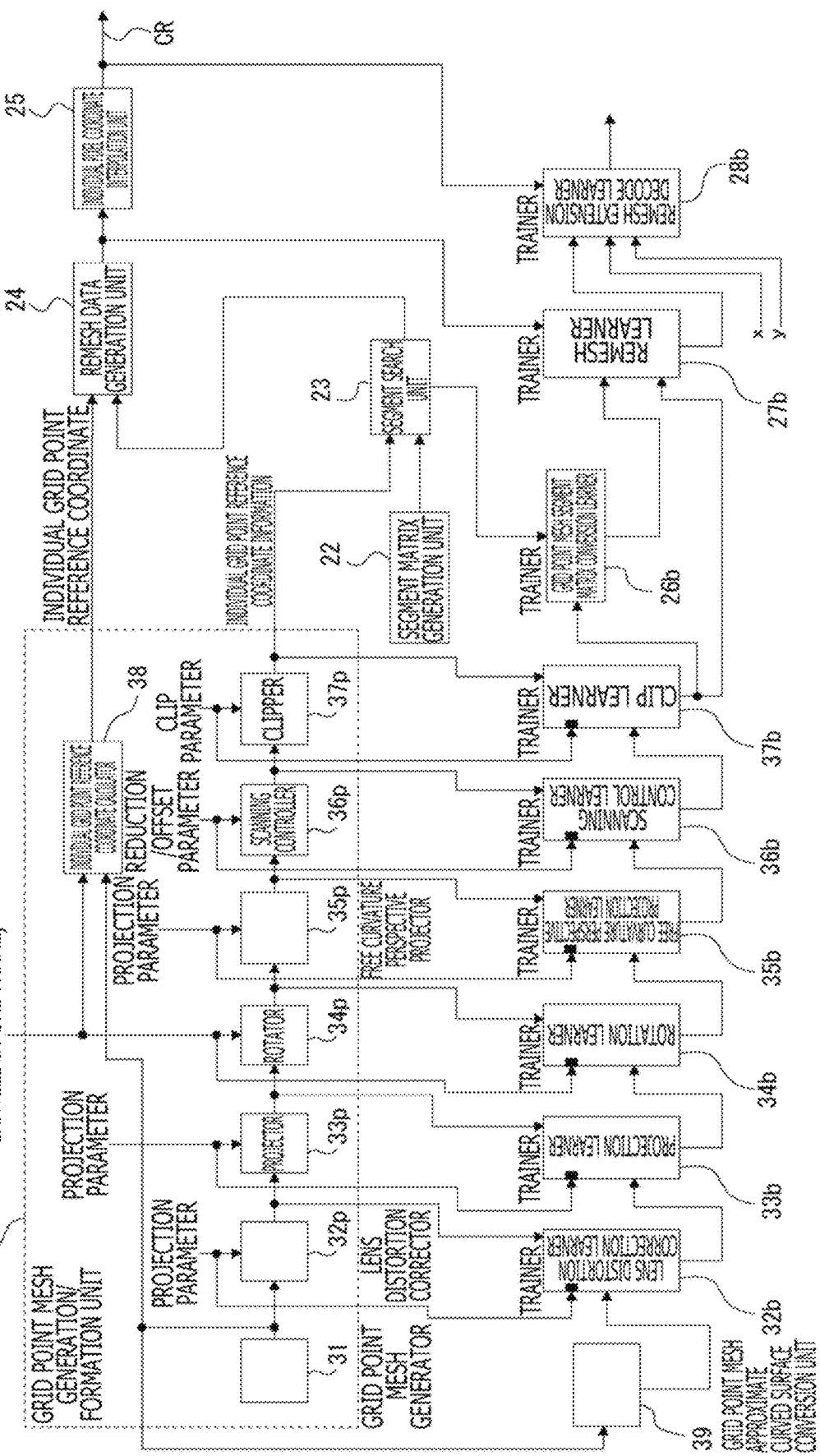
FIG. 16 is a diagram explaining machine learning for achieving a geometric modulation process performed for approximate curved surface data.

FIG. 16 is a diagram explaining machine learning for achieving the geometric modulation process performed for the approximate curved surface data described above.

First, the grid point mesh generation/formation unit 21 employed in a learning environment includes a lens distortion corrector 32*p*, a projector 33*p*, a rotator 34*p*, a free curvature perspective projector 35*p*, a scanning controller 36*p*, a clipper 37*p*, and an individual grid point reference coordinate calculator 38*p*. The lens distortion corrector 32*p*, the projector 33*p*, the rotator 34*p*, the free curvature perspective projector 35*p*, the scanning controller 36*p*, and the clipper 37*p* have functions similar to the functions of the lens distortion corrector 32, the projector 33, the rotator 34, the free curvature perspective projector 35, the scanning controller 36, and the clipper 37 described above, respectively, but are different from these components in a point that respective processes are performed as coordinate conversion processes for respective elements constituting the grid point mesh.

Specifically, the lens distortion corrector 32*p* performs the lens distortion correction process for the grid point mesh as a coordinate conversion process for each of the grid points of the grid point mesh. Moreover, the projector 33*p* performs the above-described projection process for projecting the grid point mesh to the virtual celestial sphere as a coordinate conversion process for each of the grid points. It is noted for confirmation herein that this projection process involves a conversion process from two-dimensional coordinates to three-dimensional coordinates for the coordinates of the grid points.

Further, the rotator 34*p* performs the rotation process for the grid point mesh after projection to the virtual celestial sphere as a coordinate conversion process for each of the grid points, while the free curvature perspective projector 35*p* performs the reprojection process for the grid point mesh after rotation as a coordinate conversion process for each of the grid points (this process herein involves a conversion process from three-dimensional coordinates to two-dimensional coordinates). The scanning controller 36*p* performs the affine transformation process for the grid point mesh after reprojection as a coordinate conversion process for each of the grid points, while the clipper 37*p* performs the clip process for the grid point mesh after affine transformation as a coordinate conversion process for each of the grid points.

In addition, a grid point mesh approximate curved surface conversion unit 39, a lens distortion correction learner 32*b*, a projection learner 33*b*, a rotation learner 34*b*, a free curvature perspective projection learner 35b, a scanning control learner 36b, and a clip learner 37b are used in the learning environment.

The grid point mesh approximate curved surface conversion unit 39, the lens distortion correction learner 32b, the projection learner 33b, the rotation learner 34b, the free curvature perspective projection learner 35b, the scanning control learner 36b, and the clip learner 37b are each constituted by a machine learner based on a DNN (Deep Neural Network). Specifically, according to the present embodiment, machine learners based on a CNN (Convolutional Neural Network) are employed.

Figure 17:
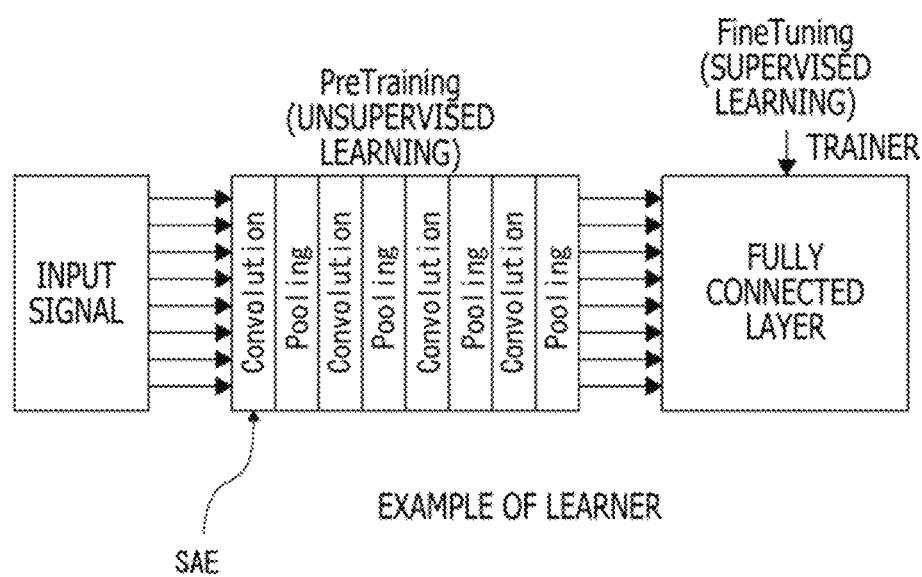
FIG. 17 is an explanatory diagram of a CNN.

FIG. 17 is an explanatory diagram of the CNN.

Note that general techniques for the DNN, such as the number of taps for input and output, the number of layers, an activation function, and a dropout method each adopted for the DNN, are not essential points of the present technology in the following description. Accordingly, detailed description of these points is omitted herein. Note that the specific numbers of layers and taps for the DNN presented hereinafter are only examples given for convenience of explanation and are not limited to these numbers.

A CNN most widespread in DNN technologies includes an SAE (stacked autoencoder) which repeats a convolution process (Convolution) and pooling, and a fully connected layer disposed in a stage subsequent to the SAE as depicted in FIG. 17. For example, a net structure such as AlexNet is generally known.

According to the CNN, a pretraining process is performed for the SAE. The pretraining process is a type of unsupervised learning (also called semi-supervised learning), and refers to a process of learning conducted in such a manner as to match output and input. In addition, supervised learning (called finetuning) performed in the fully connected layer in the subsequent stage can generate a recognition algorithm.

Note that the type of the CNN is not limited to this example. Various other derived types of CNNs are available in recent years.

Figure 18:
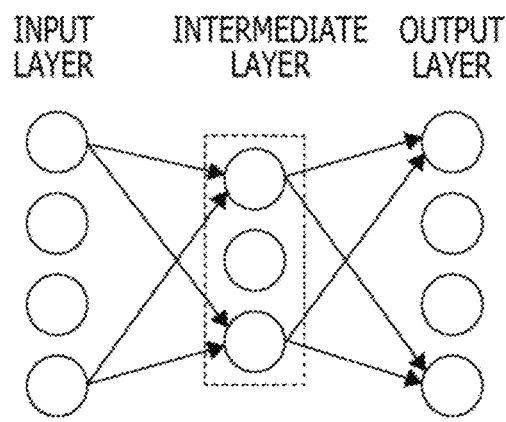
FIG. 18 is an explanatory diagram explaining encoding and decoding of input data in a stacked autoencoder.

FIG. 18 is an explanatory diagram explaining encoding and decoding of input data in the SAE.

The SAE performs an encoding process for input data input to an input layer. This encoding process is a dimension compression process for input data. Dimension compression data is obtained in an intermediate layer on the basis of the input data. A decoding process is performed for encoded data in a stage from the intermediate layer to an output layer.

The SAE herein is generally provided for the purpose of dimensional compression, but has a function of self-taught learning of target characteristic expressions achieved by pretraining for matching between input and output.

Such a self-taught learning function of the SAE is utilized for conversion of a grid point mesh into an approximate curved surface.

Specifically, the grid point mesh approximate curved surface conversion unit 39 performs, as the pretraining by the SAE, pretraining using a grid point mesh (coordinate data for each grid point) generated by the grid point mesh generator 31 as input data.

In a case where the grid point mesh is input to the SAE of the grid point mesh approximate curved surface conversion unit 39, dimension compression of the grid point mesh is achieved in the intermediate layer of the SAE. In this case, approximate curved surface data that expresses a shape of the grid point mesh and that is obtained by this dimension compression in the intermediate layer is acquirable on the basis of the pretraining described above. That is, data of the grid point mesh converted into the approximate curved surface is obtained in the intermediate layer.

In FIG. 16, the lens distortion correction learner 32b, the projection learner 33b, the rotation learner 34b, the free curvature perspective projection learner 35b, the scanning control learner 36b, and the clip learner 37b perform machine learning (finetuning described above) on the basis of training data constituted by output (processing results) from the lens distortion corrector 32p, the projector 33p, the rotator 34p, the free curvature perspective projector 35p, the scanning controller 36p, and the clipper 37p.

Specifically, the lens distortion correction learner 32b performs machine learning on the basis of learning input data constituted by approximate curved surface data of the grid point mesh obtained in the intermediate layer of the SAE of the grid point mesh approximate curved surface conversion unit 39 and on the basis of training data constituted by output from the lens distortion corrector 32p.

Such machine learning performed by the learner as the lens distortion correction learner 32b generates an algorithm for making correction (deformation) similar to that of a correction process made by the lens distortion corrector 32p for the input approximate curved surface data.

Accordingly, the coordinate conversion process need not be performed for the coordinate data of each of the grid points to carry out the geometric modulation process as the lens distortion correction process for the grid point mesh. As a result, reduction of the computation cost for the geometric modulation process is achievable.

The projection learner 33b performs machine learning on the basis of learning input data constituted by approximate curved surface data of the grid point mesh obtained in the intermediate layer of the SAE of the lens distortion correction learner 32b, which is a learner disposed immediately before the projection learner 33b, and on the basis of training data constituted by output from the projector 33p.

Such machine learning performed by the learner as the projection learner 33b generates an algorithm for making geometric modulation (deformation) similar to that of a projection process made by the projector 33p for the input approximate curved surface data.

Accordingly, the coordinate conversion process need not be performed for the coordinate data of each of the grid points to carry out the geometric modulation process as the projection process for the grid point mesh. As a result, reduction of the computation cost for the geometric modulation process is achievable.

Similarly, the rotation learner 34b, the free curvature perspective projection learner 35b, the scanning control learner 36b, and the clip learner 37b each perform machine learning on the basis of training data constituted by output from the corresponding one of the rotator 34p, the free curvature perspective projector 35p, the scanning controller 36p, and the clipper 37p and on the basis of learning input data constituted by approximate curved surface data obtained in the intermediate layer of the SAE of the learner disposed immediately before.

In this manner, each of the learners as the rotation learner 34b, the free curvature perspective projection learner 35b, the scanning control learner 36b, and the clip learner 37b generates an algorithm for making geometric modulation similar to that made in a case where the rotation process of the rotator 34p, the reprojection process of the free curvature perspective projector 35p, the affine transformation process of the scanning controller 36p, and the clip process of the clipper 37p are performed for the input approximate curved surface data.

Accordingly, the coordinate conversion process need not be performed for each of the grid points to achieve the rotation process, the reprojection process, the affine transformation process, and the clip process. As a result, reduction of the computation cost is achievable.

According to the present embodiment herein, each of the learners, i.e., the lens distortion correction learner 32b, the projection learner 33b, the rotation learner 34b, the free curvature perspective projection learner 35b, the scanning control learner 36b, and the clip learner 37b, learns the algorithm for geometric modulation of the input approximate curved surface data for each of different parameter settings of the corresponding geometric modulation process.

Specifically, the lens distortion correction learner 32b learns the algorithm of geometric modulation of the input approximate curved data for each of the settings of the different lens parameters. For example, in a case where two types of parameter settings "A" and "B" are allowed to be set as the lens parameter, learning of the lens parameter A is performed on the basis of training data constituted by output from the lens distortion corrector 32p in a setting state of the lens parameter A, to generate an algorithm for the lens parameter A. In addition, learning of the lens parameter B is performed on the basis of training data constituted by output from the lens distortion corrector 32p in a setting state of the lens parameter B, to generate an algorithm for the lens parameter B. At this time, the lens distortion correction learner 32b stores the algorithm generated for each of the parameter settings, in such a manner that the parameter setting associated with the corresponding algorithm is identifiable.

The projection learner 33b, the rotation learner 34b, the free curvature perspective projection learner 35b, the scanning control learner 36b, and the clip learner 37b each perform learning for each parameter setting in a similar manner, and stores the algorithm generated for each parameter setting by the learning, such that the parameter setting associated with the corresponding algorithm is identifiable.

According to the present embodiment herein, each of the segment matrix and the remesh data described above is also handled as approximate curved surface data to further reduce the computation cost.

For this purpose, provided in the learning environment of the present embodiment are the segment matrix generation unit 22, the segment search unit 23, the remesh data generation unit 24, and the individual pixel coordinate interpolation unit 25, and further, a grid point mesh segment matrix conversion learner 26b, a remesh learner 27b, and a remesh extension decode learner 28b, as depicted in FIG. 16.

According to the present embodiment, a learner based on the CNN is used for each of the learners, that is, the grid point mesh segment matrix conversion learner 26b, the remesh learner 27b, and the remesh extension decode learner 28b.

The grid point mesh segment matrix conversion learner 26b performs machine learning on the basis of learning input data constituted by approximate curved surface data (approximate curved surface data of the grid point mesh) obtained in the intermediate layer of the SAE of the clip learner 37b and on the basis of training data constituted by a segment search process result obtained by the segment search unit 23. It is assumed that the data of the segment search process result herein is data indicating, for each segment position (segment number) in the segment matrix, a number given to a quadrangular element containing the corresponding segment position in the grid point mesh.

Figure 19:
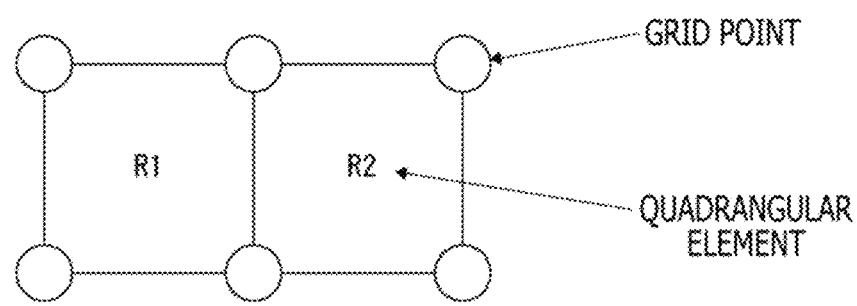
FIG. 19 is an explanatory diagram explaining quadrangular elements of the grid point mesh.

FIG. 19 is an explanatory diagram explaining the quadrangular elements of the grid point mesh.

As depicted in FIG. 19, each of quadrangular elements of the grid point mesh expresses a square portion surrounded by four adjoining grid points (four grid points adjoining in each of the row direction, the column direction, and oblique directions). A number given to each of the quadrangular elements indicates a number given to the corresponding square.

The grid point mesh segment matrix conversion learner 26b generates an algorithm for achieving a domain conversion from the approximate curved surface of the grid point mesh into an approximate curved surface of the segment matrix by using the machine learning described above.

Figure 20:
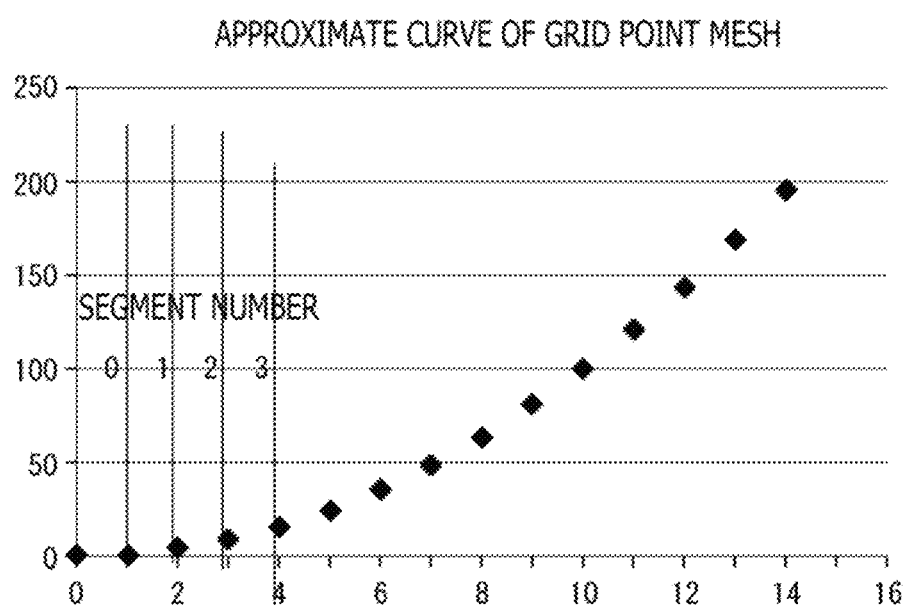
FIG. 20 depicts an example of an approximate curve of the grid point mesh in a case of assuming that the grid point mesh is one-dimensional.

A principle of such domain conversion will be described with reference to FIGS. 20 and 21 on the basis of an example of a one-dimensional case. FIG. 20 depicts an example of an approximate curve of the grid point mesh in a case of assuming that the grid point mesh is one-dimensional. The horizontal axis represents a number given to an element, while the vertical axis represents a coordinate. As apparent from this one-dimensional example, approximate curved surface data of the grid point mesh can be expressed as data equivalent to a relation expression between a number given to a quadrangular element of the grid point mesh and a coordinate.

Figure 21:
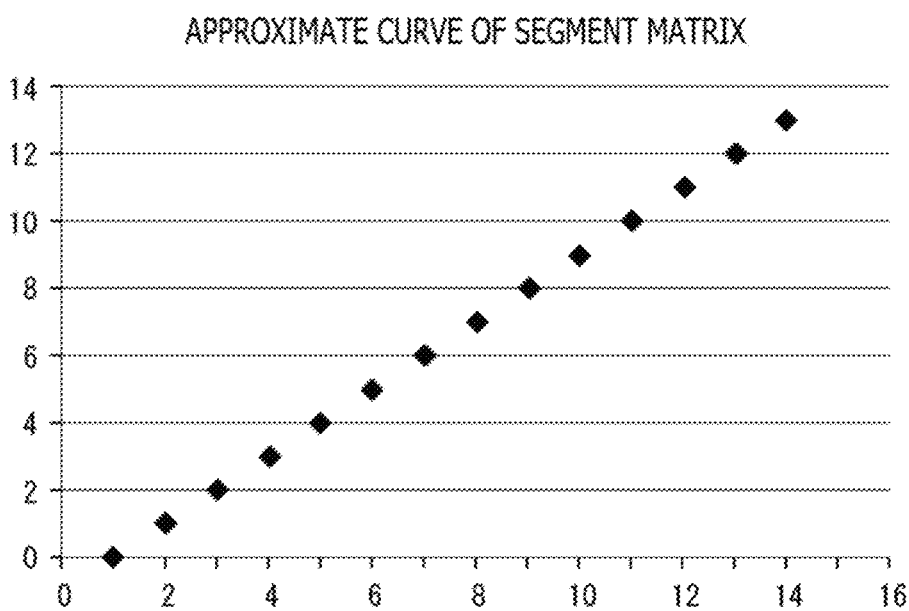
FIG. 21 is a diagram depicting an example of an approximate curve of the segment matrix in a case of assuming that the segment matrix is one-dimensional.

FIG. 21 depicts an example of an approximate curve of the segment matrix in a case of assuming that the segment matrix is one-dimensional. The horizontal axis represents a segment number, while the vertical axis represents a number given to a quadrangular element of the grid point mesh. The approximate curve of the segment matrix can be expressed as a curve equivalent to a relation expression between a number given to a quadrangular element of the grid point mesh and a segment number.

It is apparent from a comparison between FIGS. 20 and 21 that the approximate curved surface of the segment matrix exhibits a deformable correlation with the approximate curved surface of the grid point mesh.

The grid point mesh segment matrix conversion learner 26b generates an algorithm for converting approximate curved surface data of the grid point mesh input from the clip learner 37b into approximate curved surface data of the segment matrix (a relational expression between a number given to a quadrangular element of the grid point mesh and a segment number), by performing machine learning on the basis of learning input data constituted by the above-described approximate curved surface data received from the clip learner 37b and on the basis of training data constituted by a segment search process result obtained by the segment search unit 23.

The remesh learner 27b performs machine learning on the basis of learning input data constituted by approximate curved surface data of the segment matrix obtained in the intermediate layer of the SAE of the grid point mesh segment matrix conversion learner 26b and approximate curved surface data of the grid point mesh obtained in the intermediate layer of the SAE of the clip learner 37b and on the basis of training data constituted by output from the remesh data generation unit 24 (reference coordinate CR with segment granularity).

By this machine learning, the remesh learner 27b generates an algorithm for obtaining approximate curved surface data equivalent to a relation expression between a position (number) of each segment in the segment matrix and the reference coordinate CR corresponding to this segment position.

The remesh extension decode learner 28b performs machine learning on the basis of learning input data constituted by approximate curved surface data obtained in the intermediate layer of the remesh learner 27b and coordinate data for designating pixel positions in the output image (expressed as x and y in FIG. 22 in consideration that the output coordinate system is a two-dimensional coordinate system) and on the basis of training data constituted by output from the individual pixel coordinate interpolation unit 25 (i.e., the reference coordinate CR for each pixel position in the output image).

Figure 22:
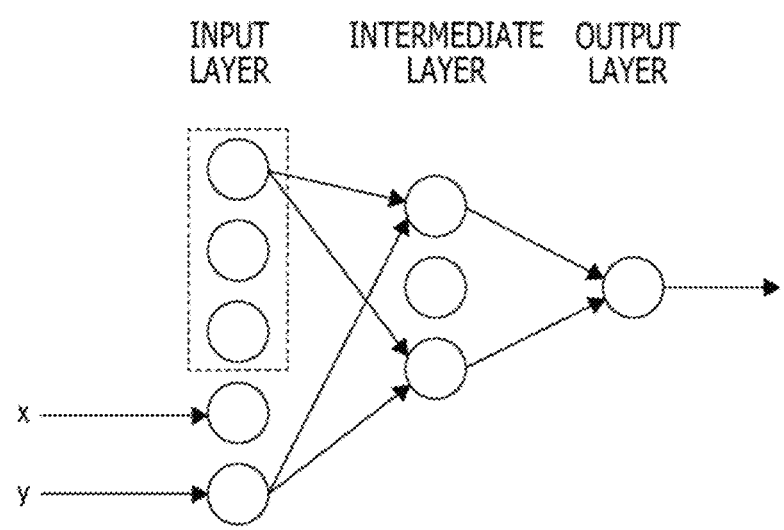
FIG. 22 is an explanatory diagram of an extension decoder included in a remesh extension decode learner.

FIG. 22 is an explanatory diagram of an extension decoder in the SAE included in the remesh extension decode learner 28b.

The remesh extension decode learner 28b performs learning for outputting the reference coordinate CR of a pixel position designated by x and y coordinate data, on the basis of input constituted by approximate curved surface data received from the remesh learner 27b.

By performing such learning, the remesh extension decode learner 28b generates an algorithm for decoding the reference coordinate CR of the pixel position designated by the x and y coordinate data, on the basis of approximate curved surface data input from the remesh learner 27b.

Figure 23:
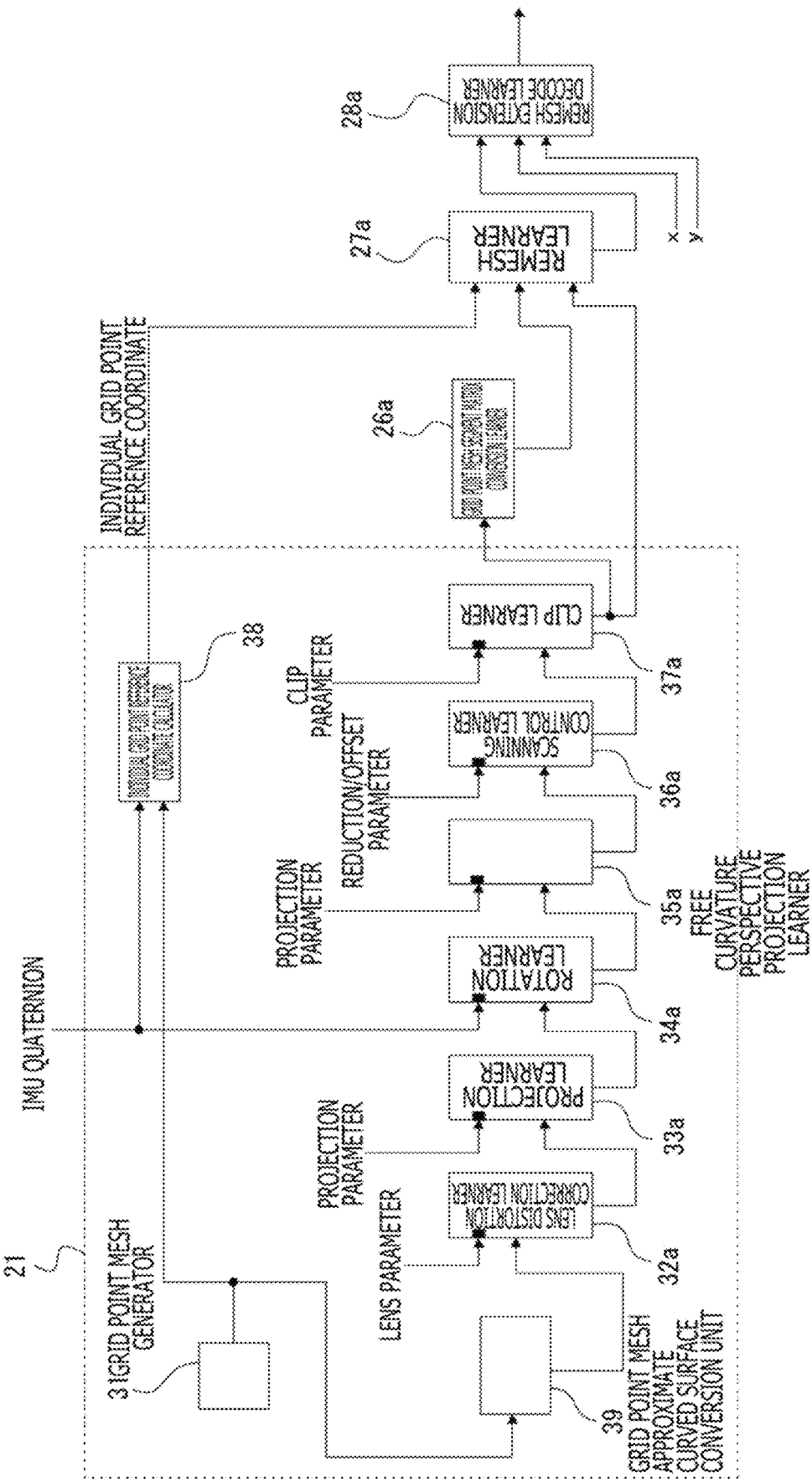
FIG. 23 is a diagram depicting a configuration example of a reference coordinate generation unit which uses each learner having already learned.

FIG. 23 is a diagram depicting a configuration example of the reference coordinate calculation unit 11 which uses each of the learners having learned.

As depicted in FIG. 23, the grid point mesh generation/formation unit 21 of the reference coordinate calculation unit 11 includes the grid point mesh generator 31 and the individual grid point reference coordinate calculator 38, and further includes the grid point mesh approximate curved surface conversion unit 39, a lens distortion correction learner 32a, a projection learner 33a, a rotation learner 34a, a free curvature perspective projection learner 35a, a scanning control learner 36a, and a clip learner 37a.

Note herein that the lens distortion correction learner 32a, the projection learner 33a, the rotation learner 34a, the free curvature perspective projection learner 35a, the scanning control learner 36a, and the clip learner 37a represent the lens distortion correction learner 32b, the projection learner 33b, the rotation learner 34b, the free curvature perspective projection learner 35b, the scanning control learner 36b, and the clip learner 37b each having already learned, respectively.

Moreover, the reference coordinate calculation unit 11 includes a grid point mesh segment matrix conversion learner 26a, a remesh learner 27a, and a remesh extension decode learner 28a. The grid point mesh segment matrix conversion learner 26a, the remesh learner 27a, and the remesh extension decode learner 28a herein represent the grid point mesh segment matrix conversion learner 26b, the remesh learner 27b, and the remesh extension decode learner 28b each having already learned, respectively.

The grid point mesh approximate curved surface conversion unit 39 of the grid point mesh generation/formation unit 21 receives input of coordinate data generated by the grid point mesh generator 31 for each grid point of the grid point mesh.

Note herein that it is sufficient if data of the grid point mesh to be used is data common to each frame. Accordingly, it is only needed to carry out the generation process performed by the grid point mesh approximate curved surface conversion unit 39 for generating approximate curved surface data at least once (it is sufficient if generated approximate curved surface data is stored in the memory and is sequentially read for each frame).

As depicted in FIG. 23, the lens distortion correction learner 32a is given input data constituted by approximate curved surface data received from the grid point mesh approximate curved surface conversion unit 39, while the projection learner 33a is given input data constituted by approximate curved surface data having been subjected to the geometric modulation process performed by the lens distortion correction learner 32a as the lens distortion correction process. Moreover, the rotation learner 34a is given input data constituted by approximate curved surface data having been subjected to the geometric modulation process performed by the projection learner 33a as the projection process, while the free curvature perspective projection learner 35a is given input data constituted by approximate curved surface data having been subjected to the geometric modulation process by the rotation learner 34a as the rotation process. Further, the scanning control learner 36a is given input data constituted by approximate curved surface data having been subjected to the geometric modulation process performed by the free curvature perspective projection learner 35a as the reprojection process, while the clip learner 37a is given input data constituted by approximate curved surface data having been subjected to the geometric modulation process by the scanning control learner 36a as the affine transformation process.

As understood from the above description, according to the present embodiment, the lens distortion correction learner 32a, the projection learner 33a, the rotation learner 34a, the free curvature perspective projection learner 35a, the scanning control learner 36a, and the clip learner 37a each learn an algorithm for each of different parameter settings in association with the geometric modulation process performed for approximate curved surface data. The lens distortion correction learner 32a, the projection learner 33a, the rotation learner 34a, the free curvature perspective projection learner 35a, the scanning control learner 36a, and the clip learner 37a described herein each have a function of selectively switching the algorithm to be used from the multiple learned algorithms to use the algorithm corresponding to the parameter setting.

The grid point mesh segment matrix conversion learner 26a is given input data constituted by approximate curved surface data of the grid point mesh having been subjected to the geometric modulation process performed by the clip learner 37a as the clip process.

The remesh learner 27a is given input data constituted by curved surface data of the segment matrix obtained by the conversion process performed by the grid point mesh segment matrix conversion learner 26a, individual grid point reference coordinates received from the individual grid point reference coordinate calculator 38, and approximate curved surface data received from the clip learner 37a.

The remesh extension decode learner 28a is given input data constituted by approximate curved surface data associated with remesh data obtained by the remesh learner 27a (approximate curved surface data equivalent to a relational expression between a segment position and the reference coordinate CR) and x and y coordinate data for designating a pixel position in the output image. In this manner, the remesh extension decode learner 28a decodes the reference coordinate CR at a pixel position designated by x and y coordinate data, on the basis of approximate curved surface data input from the remesh learner 27a, and outputs the decoded reference coordinate CR.

3. Modifications

Note that the present technology is not limited to the specific example described hereinbefore, and may adopt configurations of various modifications.

For example, while the grid point mesh in the fixed mesh mode as depicted in FIG. 24A is generated as the grid point mesh in the example described above, modes other than the fixed mesh mode, such as a one-dimensional variable mesh mode, a two-dimensional variable mesh mode, and a finite element mesh mode as depicted in FIG. 24B to FIG. 24D, for example, can be adopted for generating the grid point mesh.

Moreover, while the present technology is applied to the stabilization process performed by the signal processing device 1 in the example described above, the present technology is adoptable for wide applications each performing the geometric modulation process for an object constituted by multiple elements.

Further, while presented in the example described above as examples of the geometric modulation process for an object are the lens distortion correction process, the projection process to a virtual celestial sphere, the rotation process in a virtual celestial sphere, the reprojection process, the affine transformation process for scale reduction and an offset change, and the clip process, the geometric modulation process to which the present technology is applicable is not limited to these processes.

4. Summary of Embodiment

As described above, a signal processing device according to the embodiment (signal processing device 1) includes an approximate curved surface conversion unit (grid point mesh approximate curved surface conversion unit 39) that includes a first stacked autoencoder pretrained on the basis of learning input data constituted by coordinate data acquired for each of multiple elements of an object, and that obtains approximate curved surface data indicating an approximate curved surface of the object in an intermediate layer of the first stacked autoencoder, on the basis of input data constituted by the coordinate data acquired for each of the elements; and a geometric modulation processing unit (e.g., lens distortion correction learner 32a) that includes a second stacked autoencoder having learned by machine learning on the basis of learning input data constituted by the approximate curved surface data and on the basis of training data constituted by a result obtained by coordinate conversion for each of the elements in a geometric modulation process performed for the object, and that performs the geometric modulation process for the approximate curved surface data by using the second stacked autoencoder.

According to the above configuration, the geometric modulation process such as deformation, movement, and rotation for the object is performed for the approximate curved surface data which is data obtained by dimensional compression of coordinate data of each element with use of the first stacked autoencoder.

Accordingly, reduction of the computation cost associated with the geometric modulation process for the object is achievable in comparison with a case which performs coordinate conversion for each of the elements of the object.

Moreover, according to the signal processing device of the embodiment, as a stabilization process for a captured image captured by an imaging device, a stabilization process is performed using a grid point mesh that includes multiple grid points arranged in each of a horizontal direction and a vertical direction in an output coordinate system of the captured image and that is given movement information associated with the imaging device for each of the grid points, and the object is the grid point mesh.

In this configuration, the geometric modulation process, such as deformation and rotation, performed for the grid point mesh by the stabilization process using the grid point mesh is carried out for the approximate curved surface data of the grid point mesh.

Accordingly, reduction of the computation cost associated with geometric modulation for the grid point mesh, and therefore, reduction of the computation cost for the stabilization process are achievable.

Further, the signal processing device according to the embodiment further includes a grid point mesh segment matrix conversion unit (grid point mesh segment matrix conversion learner 26a) that includes a third stacked autoencoder having learned by machine learning on the basis of training data constituted by a result obtained by a segment search process for identifying a square which is included in squares of the grid point mesh subjected to the geometric modulation process and which contains a searched segment of segments in a segment matrix formed by dividing, into the segments, an image frame of an output image output by the stabilization process and on the basis of learning input data constituted by the approximate curved surface data having been subjected to the geometric modulation process, and that obtains approximate curved surface data that indicates a correspondence between each of the segments and each of the squares of the grid point mesh in an intermediate layer of the third stacked autoencoder, on the basis of input data constituted by the approximate curved surface data having been subjected to the geometric modulation process.

In this configuration, approximate curved surface data indicating a correspondence between respective segments and squares in the grid point mesh (approximate curved surface data generated by conversion from the grid point mesh into a domain of the segment matrix) is obtained on the basis of input constituted by the approximate curved surface data of the grid point mesh. That is, when approximate curved surface data corresponding to the segment search result is to be obtained, a need for performing a relatively heavy process for generating approximate curved surface data corresponding to the segment matrix can be eliminated.

Accordingly, reduction of the computation cost associated with the stabilization process is achievable.

In addition, the signal processing device according to the embodiment further includes a remesh approximate curved surface data generation unit (remesh learner 27a) that includes a fourth stacked autoencoder having learned by machine learning on the basis of training data constituted by remesh data obtained by a remesh data generation unit (remesh data generation unit 24) for generating the remesh data indicating the movement information with granularity of the segments with reference to the result of the segment search process and the movement information associated for each of the grid points and on the basis of learning input data constituted by the approximate curved surface data having been subjected to the geometric modulation process and approximate curved surface data obtained by the grid point mesh segment matrix conversion unit, and that obtains approximate curved surface data of the remesh data in an intermediate layer of the fourth stacked autoencoder on the basis of input data constituted by the approximate curved surface data having been subjected to the geometric modulation process, approximate curved surface data obtained by the grid point mesh segment matrix conversion unit, and the movement information associated for each of the grid points.

In this configuration, each process from the geometric modulation process for the grid point mesh to remesh data generation can be consistently achieved by processes each handling approximate curved surface data.

Accordingly, reduction of the computation cost associated with the stabilization process is achievable.

Moreover, the signal processing device according to the embodiment further includes a movement information decoding unit (remesh extension decode learner 28a) that includes a fifth stacked autoencoder having learned by machine learning on the basis of training data constituted by the movement information obtained for each of pixel positions within the image frame of the output image by an individual pixel movement information calculation unit (individual grid point reference coordinate calculator 38) that obtains the movement information indicating each of the pixel positions with reference to the remesh data obtained by the remesh data generation unit and on the basis of learning input data constituted by the approximate curved surface data obtained by the remesh approximate curved surface data generation unit and coordinate data designating the pixel positions, and that outputs the movement information in a designated coordinate within the image frame of the output image on the basis of input constituted by the approximate curved surface data obtained by the remesh approximate curved surface data generation unit and the coordinate data designating the pixel positions.

In this configuration, movement information for each output pixel position required for the stabilization process can be appropriately decoded from the approximate curved surface data corresponding to the remesh data.

Further, according to the signal processing device of the present embodiment, the second stacked autoencoder included in the geometric modulation processing unit learns an algorithm for geometrically modulating the approximate curved surface data for each of different parameter settings of the geometric modulation process, and the geometric modulation processing unit switches the algorithm according to each of the parameter settings.

In this configuration, a parameter setting change is allowed in the geometric modulation process for the approximate curved surface data.

Accordingly, the geometric modulation process in each of different parameter settings is handleable using the single signal processing device, and therefore, the necessity of preparing a signal processing device different for each parameter setting is eliminated.

Moreover, such a case that allows dynamic switching between parameter settings is handleable. For example, a lens-interchangeable camera system which performs deformation for a lens distortion correction process as the geometric modulation process requires a dynamic change of a parameter setting of the lens distortion correction process according to a lens change. In such a case, the dynamic change of the parameter setting is achievable using the single signal processing device.

In addition, a signal processing method according to the embodiment includes obtaining approximate curved surface data indicating an approximated curved surface of an object in an intermediate layer of a first stacked autoencoder pretrained on the basis of learning input data constituted by coordinate data acquired for each of multiple elements of the object, the approximate curved surface data being obtained on the basis of input data constituted by the coordinate data acquired for each of the elements; and performing a geometric modulation process for the approximate curved surface data by using a second stacked autoencoder having learned by machine learning on the basis of learning input data constituted by the approximate curved surface data and on the basis of training data constituted by a result obtained by coordinate conversion for each of the elements in the geometric modulation process performed for the object.

The first signal processing method described above can also offer operations and effects similar to those of the first signal processing device described above.

Note that advantageous effects to be offered are presented only by way of example and are not limited to those described in the present specification. In addition, other advantageous effects may be offered.

5. Present Technology

Note that the present technology can also have the following configurations.

(1)

A signal processing device including:

an approximate curved surface conversion unit that includes a first stacked autoencoder pretrained on the basis of learning input data constituted by coordinate data acquired for each of multiple elements of an object, and that obtains approximate curved surface data indicating an approximate curved surface of the object in an intermediate layer of the first stacked autoencoder, on the basis of input data constituted by the coordinate data acquired for each of the elements; and a geometric modulation processing unit that includes a second stacked autoencoder having learned by machine learning on the basis of learning input data constituted by the approximate curved surface data and on the basis of training data constituted by a result obtained by coordinate conversion for each of the elements in a geometric modulation process performed for the object, and that performs the geometric modulation process for the approximate curved surface data by using the second stacked autoencoder.

(2)

The signal processing device according to (1) described above, in which, as a stabilization process for a captured image captured by an imaging device, a stabilization process is performed using a grid point mesh that includes multiple grid points arranged in each of a horizontal direction and a vertical direction in an output coordinate system of the captured image and that is given movement information associated with the imaging device for each of the grid points, and the object is the grid point mesh.

(3)

The signal processing device according to (2) described above, further including:

a grid point mesh segment matrix conversion unit that includes a third stacked autoencoder having learned by machine learning on the basis of training data constituted by a result obtained by a segment search process for identifying a square which is included in squares of the grid point mesh having been subjected to the geometric modulation process and which contains a searched segment of segments in a segment matrix formed by dividing, into the segments, an image frame of an output image output by the stabilization process and on the basis of learning input data constituted by the approximate curved surface data having been subjected to the geometric modulation process, and that obtains approximate curved surface data that indicates a correspondence between each of the segments and each of the squares of the grid point mesh in an intermediate layer of the third stacked autoencoder, on the basis of input data constituted by the approximate curved surface data having been subjected to the geometric modulation process.

(4)

The signal processing device according to (3) described above, further including:

a remesh approximate curved surface data generation unit that includes a fourth stacked autoencoder having learned by machine learning on the basis of training data constituted by remesh data obtained by a remesh data generation unit for generating the remesh data indicating the movement information with granularity of the segments with reference to the result of the segment search process and the movement information associated for each of the grid points and on the basis of learning input data constituted by the approximate curved surface data having been subjected to the geometric modulation process and approximate curved surface data obtained by the grid point mesh segment matrix conversion unit, and that obtains approximate curved surface data of the remesh data in an intermediate layer of the fourth stacked autoencoder on the basis of input data constituted by the approximate curved surface data having been subjected to the geometric modulation process, approximate curved surface data obtained by the grid point mesh segment matrix conversion unit, and the movement information associated for each of the grid points.

(5)

The signal processing device according to (4) described above, further including:

a movement information decoding unit that includes a fifth stacked autoencoder having learned by machine learning on the basis of training data constituted by the movement information obtained for each of pixel positions within the image frame of the output image by an individual pixel movement information calculation unit that obtains the movement information indicating the pixel positions with reference to the remesh data obtained by the remesh data generation unit and on the basis of learning input data constituted by the approximate curved surface data obtained by the remesh approximate curved surface data generation unit and coordinate data designating the pixel positions, and that outputs the movement information in a designated coordinate within the image frame of the output image on the basis of input constituted by the approximate curved surface data obtained by the remesh approximate curved surface data generation unit and the coordinate data designating the pixel positions.

(6)

The signal processing device according to any one of (1) to (5) described above, in which the second stacked autoencoder included in the geometric modulation processing unit learns an algorithm for geometrically modulating the approximate curved surface data for each of different parameter settings of the geometric modulation process, and the geometric modulation processing unit switches the algorithm according to each of the parameter settings.

(7)

A signal processing method including:

obtaining approximate curved surface data indicating an approximated curved surface of an object in an intermediate layer of a first stacked autoencoder pretrained on the basis of learning input data constituted by coordinate data acquired for each of multiple elements of the object, the approximate curved surface data being obtained on the basis of input data constituted by the coordinate data acquired for each of the elements; and performing a geometric modulation process for the approximate curved surface data by using a second stacked autoencoder having learned by machine learning on the basis of learning input data constituted by the approximate curved surface data and on the basis of training data constituted by a result obtained by coordinate conversion for each of the elements in the geometric modulation process performed for the object.

REFERENCE SIGNS LIST

1: Signal processing device
2: IMU sensor
3: Image sensor
6: Quaternion calculation unit
7: Stabilization processing unit
11: Reference coordinate calculation unit
12: Buffer control unit
13: Buffer memory
14: Memory control unit
15: Cache memory
16: Interpolation filter
CR: Reference coordinate
L1: Virtual line
Pr: Reference pixel
Ar: Reference region
21: Grid point mesh generation/formation unit
22: Segment matrix generation unit
23: Segment search unit
24: Remesh data generation unit
25: Individual pixel coordinate interpolation unit
31: Grid point mesh generator
32: Lens distortion corrector
33: Projector
34: Rotator
35: Free curvature perspective projector
36: Scanning controller
37: Clipper
38: Individual grid point reference coordinate calculator
32$b$, 32$a$: Lens distortion correction learner
33$b$, 33$a$: Projection learner
34$b$, 34$a$: Rotation learner
35$b$, 35$a$: Free curvature perspective projection learner
36$b$, 36$a$: Scanning control learner
37$b$, 37$a$: Clip learner
26$b$, 26$a$: Grid point mesh segment matrix conversion learner
27$b$, 27$a$: Remesh learner
28$b$, 28$a$: Remesh extension decode learner
39: Grid point mesh approximate curved surface conversion unit

The invention claimed is:

1. A signal processing device comprising:

an approximate curved surface conversion unit that includes a first stacked autoencoder pretrained on a basis of learning input data constituted by coordinate data acquired for each of multiple elements of an object, and that obtains approximate curved surface data indicating an approximate curved surface of the object in an intermediate layer of the first stacked autoencoder, on a basis of input data constituted by the coordinate data acquired for each of the elements; and a geometric modulation processing unit that includes a second stacked autoencoder having learned by machine learning on a basis of learning input data constituted by the approximate curved surface data and on a basis of training data constituted by a result obtained by coordinate conversion for each of the elements in a geometric modulation process performed for the object, and that performs the geometric modulation process for the approximate curved surface data by using the second stacked autoencoder.

2. The signal processing device according to claim 1, wherein, as a stabilization process for a captured image captured by an imaging device, a stabilization process is performed using a grid point mesh that includes multiple grid points arranged in each of a horizontal direction and a vertical direction in an output coordinate system of the captured image and that is given movement information associated with the imaging device for each of the grid points, and the object is the grid point mesh.

3. The signal processing device according to claim 2, further comprising:

a grid point mesh segment matrix conversion unit that includes a third stacked autoencoder having learned by machine learning on a basis of training data constituted by a result obtained by a segment search process for identifying a square which is included in squares of the grid point mesh having been subjected to the geometric modulation process and which contains a searched segment of segments in a segment matrix formed by dividing, into the segments, an image frame of an output image output by the stabilization process and on a basis of learning input data constituted by the approximate curved surface data having been subjected to the geometric modulation process, and that obtains approximate curved surface data that indicates a correspondence between each of the segments and each of the squares of the grid point mesh in an intermediate layer of the third stacked autoencoder, on a basis of input data constituted by the approximate curved surface data having been subjected to the geometric modulation process.

4. The signal processing device according to claim 3, further comprising:

a remesh approximate curved surface data generation unit that includes a fourth stacked autoencoder having learned by machine learning on a basis of training data constituted by remesh data obtained by a remesh data generation unit for generating the remesh data indicating the movement information with granularity of the segments with reference to the result of the segment search process and the movement information associated for each of the grid points and on a basis of learning input data constituted by the approximate curved surface data having been subjected to the geometric modulation process and approximate curved surface data obtained by the grid point mesh segment matrix conversion unit, and that obtains approximate curved surface data of the remesh data in an intermediate layer of the fourth stacked autoencoder on a basis of input data constituted by the approximate curved surface data having been subjected to the geometric modulation process, approximate curved surface data obtained by the grid point mesh segment matrix conversion unit, and the movement information associated for each of the grid points.

5. The signal processing device according to claim 4, further comprising:

a movement information decoding unit that includes a fifth stacked autoencoder having learned by machine learning on a basis of training data constituted by the movement information obtained for each of pixel positions within the image frame of the output image by an individual pixel movement information calculation unit that obtains the movement information indicating the pixel positions with reference to the remesh data obtained by the remesh data generation unit and on a basis of learning input data constituted by the approximate curved surface data obtained by the remesh approximate curved surface data generation unit and coordinate data designating the pixel positions, and that outputs the movement information in a designated coordinate within the image frame of the output image on a basis of input constituted by the approximate curved surface data obtained by the remesh approximate curved surface data generation unit and the coordinate data designating the pixel positions.

6. The signal processing device according to claim 1, wherein the second stacked autoencoder included in the geometric modulation processing unit learns an algorithm for geometrically modulating the approximate curved surface data for each of different parameter settings of the geometric modulation process, and the geometric modulation processing unit switches the algorithm according to each of the parameter settings.

7. A signal processing method comprising:

obtaining approximate curved surface data indicating an approximated curved surface of an object in an intermediate layer of a first stacked autoencoder pretrained on a basis of learning input data constituted by coordinate data acquired for each of multiple elements of the object, the approximate curved surface data being obtained on a basis of input data constituted by the coordinate data acquired for each of the elements; and performing a geometric modulation process for the approximate curved surface data by using a second stacked autoencoder having learned by machine learning on a basis of learning input data constituted by the approximate curved surface data and on a basis of training data constituted by a result obtained by coordinate conversion for each of the elements in the geometric modulation process performed for the object.

* * * * *